United States Patent
Yamagishi et al.

(10) Patent No.: US 11,558,114 B2
(45) Date of Patent: Jan. 17, 2023

(54) OPTICAL TRANSMISSION CHARACTERISTICS COMPENSATING METHOD AND OPTICAL TRANSMISSION CHARACTERISTICS COMPENSATING SYSTEM

(71) Applicants: NTT Electronics Corporation, Yokohama (JP); NIPPON TELEGRAPH AND TELEPHONE CORPORATION, Tokyo (JP)

(72) Inventors: Akihiro Yamagishi, Kanagawa (JP); Atsushi Hoki, Kanagawa (JP); Katsuya Tanaka, Kanagawa (JP); Eisuke Tsuchiya, Kanagawa (JP); Masanori Nakamura, Tokyo (JP); Asuka Matsushita, Tokyo (JP)

(73) Assignees: NTT Electronics Corporation, Yokohama (JP); NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/593,518

(22) PCT Filed: May 21, 2020

(86) PCT No.: PCT/JP2020/020093
§ 371 (c)(1),
(2) Date: Sep. 20, 2021

(87) PCT Pub. No.: WO2020/235627
PCT Pub. Date: Nov. 26, 2020

(65) Prior Publication Data
US 2022/0173807 A1   Jun. 2, 2022

(30) Foreign Application Priority Data

May 22, 2019   (JP) .............................. JP2019-095971

(51) Int. Cl.
H04B 10/2507   (2013.01)
H04B 10/079   (2013.01)
H04B 10/58   (2013.01)

(52) U.S. Cl.
CPC ....... *H04B 10/2507* (2013.01); *H04B 10/079* (2013.01); *H04B 10/58* (2013.01)

(58) Field of Classification Search
None
See application file for complete search history.

(56) References Cited

U.S. PATENT DOCUMENTS 6,400,233 B1   6/2002   Thomas
8,244,141 B2 *   8/2012   Fu ..................... H04B 10/5162
                                                            398/198

(Continued)

FOREIGN PATENT DOCUMENTS

JP   2001-60883 A   3/2001
JP   4268760 B2   5/2009

(Continued)

OTHER PUBLICATIONS

International Search Report and Written Opinion of the International Searching Authority issued by the Japan Patent Office for corresponding International Patent Application No. PCT/JP2020/020093, dated Jul. 14, 2020, with a partial English translation.

*Primary Examiner* — Jai M Lee
(74) *Attorney, Agent, or Firm* — Myers Wolin, LLC

(57) ABSTRACT

Part of compensation of the transmission characteristics of the optical transmitter is performed by transmitter compensation circuitry disposed at a stage prior to the optical transmitter. Remaining part of compensation of the transmission characteristics of the optical transmitter and compensation of the transmission characteristics of the optical receiver is performed by a receiver compensation circuitry disposed at a stage subsequent to the optical receiver.

(Continued)

Transmitter compensation characteristics of the transmitter compensation circuitry is set so that a peak-to-average-power ratio of an output signal from the transmitter compensation circuitry becomes equal to or smaller than a predetermined value.

18 Claims, 11 Drawing Sheets

(56) References Cited

U.S. PATENT DOCUMENTS

| | | | | |
|---|---|---|---|---|
| 8,396,374 | B2 * | 3/2013 | Mizuochi | H04B 10/564 |
| | | | | 398/94 |
| 8,909,061 | B1 * | 12/2014 | Varadarajan | H04B 10/6161 |
| | | | | 398/210 |
| 9,160,456 | B2 * | 10/2015 | Liu | H04B 10/58 |
| 9,520,950 | B2 * | 12/2016 | Harley | H04B 10/532 |
| 9,838,137 | B2 * | 12/2017 | Lozhkin | H04B 10/25758 |
| 10,225,017 | B2 * | 3/2019 | Le Taillandier De Gabory | |
| | | | | H04B 10/50595 |
| 10,236,982 | B1 * | 3/2019 | Zhuge | H04B 10/073 |
| 10,313,014 | B2 * | 6/2019 | Frankel | H04B 10/5053 |
| 10,341,022 | B2 * | 7/2019 | Zhang | H04B 10/2543 |
| 10,404,376 | B2 * | 9/2019 | Schmogrow | H04B 10/2543 |
| 11,206,084 | B2 * | 12/2021 | Yamaguchi | H04B 10/2513 |
| 2004/0105682 | A1 * | 6/2004 | Roberts | H04B 10/2572 |
| | | | | 398/147 |
| 2012/0201546 | A1 * | 8/2012 | Mizuochi | H04B 10/5162 |
| | | | | 398/147 |
| 2016/0099776 | A1 | 4/2016 | Nakashima et al. | |
| 2020/0036440 | A1 | 1/2020 | Yamagishi et al. | |
| 2022/0045766 | A1 * | 2/2022 | Le | H04B 10/614 |
| 2022/0173807 | A1 * | 6/2022 | Yamagishi | H04B 10/2507 |

FOREIGN PATENT DOCUMENTS

| | | |
|---|---|---|
| JP | 2016-72942 A | 5/2016 |
| JP | 2018-19255 A | 2/2018 |
| JP | 6319487 B1 | 5/2018 |

* cited by examiner

OPTICAL TRANSMISSION CHARACTERISTICS COMPENSATING METHOD AND OPTICAL TRANSMISSION CHARACTERISTICS COMPENSATING SYSTEM

CROSS-REFERENCE TO RELATED APPLICATION

This application is a national stage application of International Application No. PCT/JP2020/020093, filed on May 21, 2020 and designated the U.S., which claims priority to Japanese Patent Application No. 2019-095971, filed on May 22, 2019. The contents of each are herein incorporated by reference.

FIELD

The present disclosure relates to an optical transmission characteristics compensating method and an optical transmission characteristics compensating system.

BACKGROUND

In digital coherent optical communication, large-capacity transmission at several tens Gbit/s or higher is enabled by compensating for, through digital signal processing, signal distortion generated at an optical transmitter, an optical fiber transmission path, and an optical receiver. Accordingly, long-distance transmission with a reduced number of relays halfway through transmission can be achieved. As for a signal modulation scheme, not only QPSK but also high multiple-value modulation such as 16QAM or 256QAM can be applied, and thus a transmission rate can be largely increased.

Along with the increase in transmission rate and the multiple-value modulation, favorable transmission characteristics in a wide band are required for an optical transmitter and an optical receiver. Transmission characteristics of a transmission signal between the optical transmitter and the optical receiver are expressed by a transfer function and compensated for by compensation circuits on the transmitter side and the receiver side. Improvement of the accuracy of compensation is required along with the increased in transmission rate. To this end, distortion at the optical transmitter has been compensated for on the transmitting side. Accordingly, distortion at a transmission path and the optical receiver needs to be compensated for on the receiving side.

PTL 1 discloses a method of detecting waveform distortion of an optical transmission device based on a training signal and correcting the waveform distortion by the optical transmission device. PTL 2 discloses a device and a method configured to compensate for distortion at an IQ modulator on the transmitting side. PTL 3 discloses a device configured to perform wide-band and highly-accurate non-linear distortion compensation at an optical transmitter used in a wireless communication system of a linear modulation scheme. In this system, distortion is detected and compensated for at the optical transmitter. The optical transmitter can basically form flat transmission characteristics through distortion compensation operation.

PTL 4 discloses a configuration in which non-linear signal distortion that is caused in a transmission signal by a semiconductor optical amplifier of an optical transmitter is compensated for at a non-linear signal distortion compensation unit of the optical transmitter in advance, and a configuration in which the non-linear signal distortion that occurs in the transmission signal is compensated for (equalized) only on the receiving side at a non-linear distortion compensation unit of an optical receiver. In other words, a configuration in which flat transmission characteristics are formed at the transmitter as well as a configuration in which the transmission characteristics are all equalized on the receiving side are disclosed.

PTL 5 discloses a calibration method when an optical communication system is configured. In the calibration method, a transfer function representing transmission characteristics of an optical transmitter is estimated, and an inverse transfer function of the transfer function is set to a transmitter compensation unit. A transfer function representing transmission characteristics of an optical receiver is estimated, and an inverse transfer function of the transfer function is set to a receiver compensation unit. Accordingly, the characteristics of the optical transmitter and the characteristics of the optical receiver essentially become flat characteristics.

CITATION LIST

Patent Literature

[PTL 1] JP 2016-072942 A
[PTL 2] JP 4268760
[PTL 3] JP 2001-060883 A
[PTL 4] JP 2018-19255 A
[PTL 5] JP 6319487

SUMMARY

Technical Problem

An optical transmitter on the transmitting side typically has low-pass transmission characteristics. To compensate this, compensation characteristics that enhance a high-frequency region are set to a prior compensation circuit so that the transmission characteristics of the transmitting side including the compensation circuit and the optical transmitter become flat characteristics. When the transmission characteristics of the transmitting side are flattened, compensation on the receiving side is performed on the transmission characteristics of the optical fiber transmission path and the optical receiver.

However, when the compensation characteristics of the compensation circuit on the transmitting side are set to be characteristics that enhance the high-frequency region, high-frequency waves increase and a waveform rise becomes steep, as a result, overshoot becomes large. Accordingly, a peak-to-average-power ratio (PAPR) becomes large, and a non-linear effect occurs in the optical transmitter on the transmitting side and degrades the transmission characteristics, which has been a problem.

The present disclosure is intended to solve the problem as described above, and it is an objective of the present disclosure to obtain an optical transmission characteristics compensating method and an optical transmission characteristics compensating system that are capable of preventing a non-linear effect from occurring in an optical transmitter and degrading transmission characteristics.

Solution to Problem

An optical transmission characteristics compensating method compensating transmission characteristics of an optical transmitter and an optical receiver connected with each other through an optical fiber transmission path according to the present disclosure, includes: performing part of compensation of the transmission characteristics of the optical transmitter by a transmitter compensation unit disposed at a stage prior to the optical transmitter; and performing remaining part of compensation of the transmission characteristics of the optical transmitter and compensation of the transmission characteristics of the optical receiver by a receiver compensation unit disposed at a stage subsequent to the optical receiver, wherein transmitter compensation characteristics of the transmitter compensation unit is set so that a peak-to-average-power ratio of an output signal from the transmitter compensation unit becomes equal to or smaller than a predetermined value.

Advantageous Effects of Disclosure

In the present disclosure, it is possible to prevent a non-linear effect from occurring in the optical transmitter and degrading the transmission characteristics thereof.

DESCRIPTION OF EMBODIMENTS

An optical transmission characteristics compensating method and an optical transmission characteristics compensating system according to the embodiments of the present disclosure will be described with reference to the drawings. The same components will be denoted by the same symbols, and the repeated description thereof may be omitted.

Embodiment 1

Figure 1:
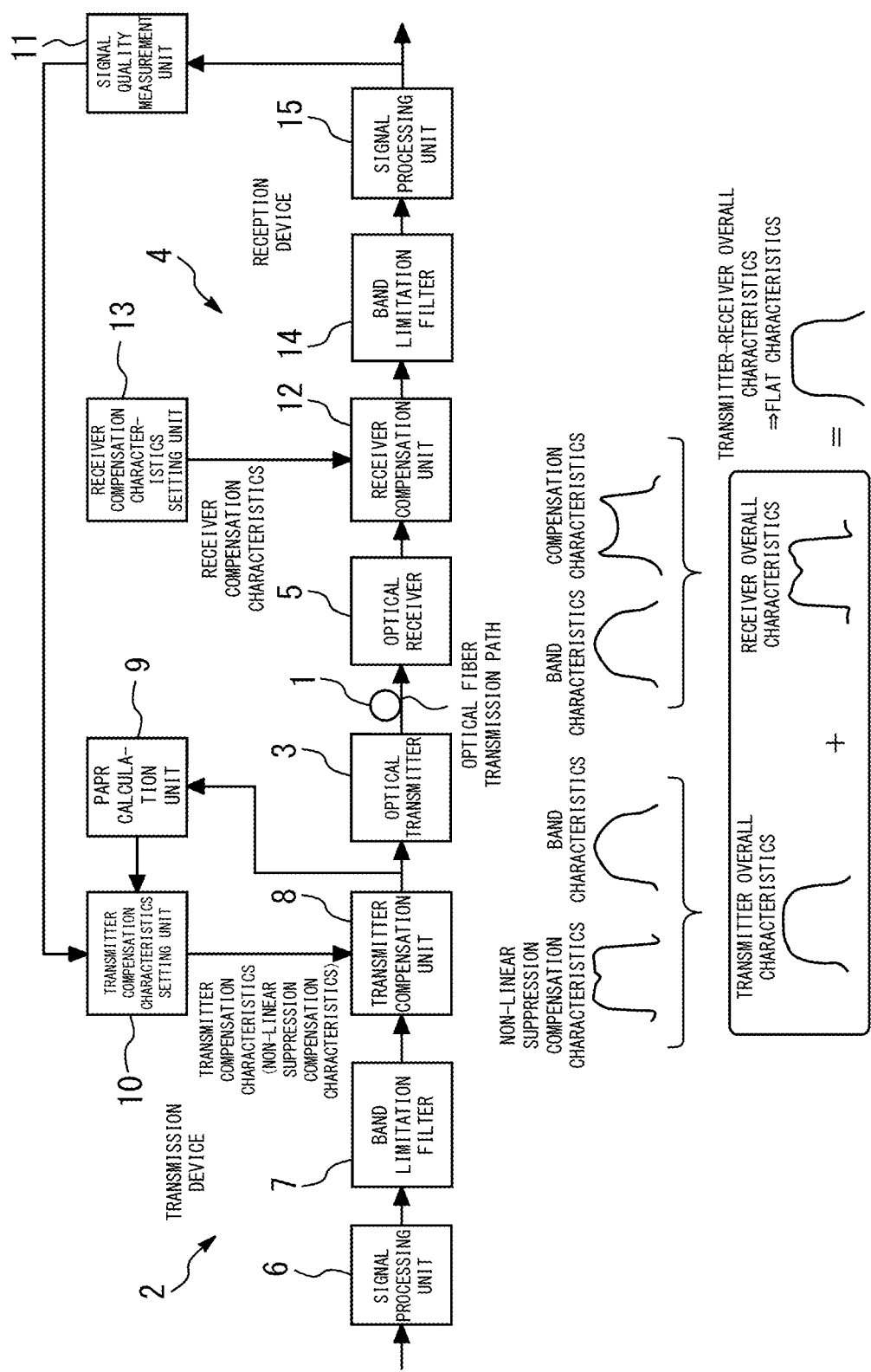
FIG. 1 is a diagram illustrating an optical transmission characteristics compensating system according to Embodiment 1.

FIG. 1 is a diagram illustrating an optical transmission characteristics compensating system according to Embodiment 1. This optical transmission characteristics compensating system compensates transmission characteristics of an optical transmitter 3 of a transmission device 2 and transmission characteristics of an optical receiver 5 of a reception device 4 connected with each other through an optical fiber transmission path 1.

In the transmission device 2, a signal processing unit 6 performs error correction encoding or the like on input data. A band limitation filter 7 performs band limitation on output data from the signal processing unit 6. A transmitter compensation unit 8 disposed at a stage prior to the optical transmitter 3 compensates in advance the transmission characteristics of the optical transmitter 3 at a later stage. However, although described later, the transmitter compensation unit 8 performs only part of compensation of the transmission characteristics of the optical transmitter 3.

A PAPR calculation unit 9 calculates a peak-to-average-power ratio (PAPR) of an output signal from the transmitter compensation unit 8. When inverse characteristics of the transmission characteristics of the optical transmitter 3 are set to the transmitter compensation unit 8, the output signal from the transmitter compensation unit 8 is determined by the waveform of an output signal from the band limitation filter 7, which is known, and the inverse characteristics of the transmission characteristics of the optical transmitter 3. Thus, the PAPR also can be calculated from the transmission characteristics of the optical transmitter 3.

To reduce influence of a non-linear effect at the optical transmitter 3, a transmitter compensation characteristics setting unit 10 calculates transmitter compensation characteristics with which the PAPR of the output signal from the transmitter compensation unit 8 becomes equal to or smaller than a predetermined value, and sets the transmitter compensation characteristics to the transmitter compensation unit 8. Specifically, the transmitter compensation characteristics are calculated by superimposing, on conventional compensation characteristics for compensating the transmission characteristics of the optical transmitter 3, non-linear suppression characteristics for suppressing the non-linear effect. Although described later, the transmitter compensation characteristics setting unit 10 calculates the transmitter compensation characteristics by adjusting the non-linear suppression characteristics with reference to a result of measurement by a signal quality measurement unit 11 of the reception device 4 as well.

The optical transmitter 3 includes an analog circuit such as a D/A converter, a quadrature modulator, or a buffer amplifier, converts an electric signal input from the transmitter compensation unit 8 into an optical signal, and supplies the optical signal to the optical fiber transmission path 1. When the PAPR of the output signal from the transmitter compensation unit 8 is large, a non-linear effect occurs in the analog circuit such as a quadrature modulator or a buffer amplifier. When the amplitude of an analog signal to be formed at the D/A converter is equal to or larger than an amplitude that can be formed by the D/A converter, the signal is clipped. The clipped signal is supplied to the quadrature modulator, the buffer amplifier, or the like of the optical transmitter 3. The number of clipped samples among samples of the signal over a constant interval is referred to as a clipping rate. As the clipping rate increases, the PAPR of the signal decreases. Thus, the PAPR calculation unit 9 may calculate the PAPR by considering the clipping rate of the D/A converter as well.

The optical fiber transmission path 1 transmits, to the optical receiver 5 of the reception device 4, the optical signal output from the optical transmitter 3 of the transmission device 2. The optical receiver 5 includes an analog circuit such as a quadrature demodulator or a buffer amplifier and converts the optical signal received from the optical fiber transmission path 1 into an electric signal.

A receiver compensation unit 12 disposed at a stage subsequent to the optical receiver 5 mainly performs compensation of the transmission characteristics of the optical receiver 5. Although described later, the receiver compensation unit 12 also performs the remaining part of compensation of the transmission characteristics of the optical transmitter 3, which is not compensated by the transmitter compensation unit 8.

A receiver compensation characteristics setting unit 13 sets receiver compensation characteristics of the receiver compensation unit 12. A band limitation filter 14 performs band limitation on an output signal from the receiver compensation unit 12. A signal processing unit 15 recovers the input data by performing, on the output signal from the band limitation filter 7, various kinds of signal processing such as compensation of transmission characteristics of the optical fiber transmission path 1 and frequency offset compensation. The signal quality measurement unit 11 measures bit error rate characteristics of the data recovered by the signal processing unit 15.

Note that, in the present specification, "flattening" or "flat characteristics" means that passband characteristics are flat. "Band characteristics" and "transmission characteristics" mean frequency characteristics in a passband. A "transfer function" is a function that expresses the "transmission characteristics". Transmitter overall characteristics are characteristics of a combination of the transmitter compensation unit 8 and the optical transmitter 3. Receiver overall characteristics are characteristics of a combination of the optical receiver 5 and the receiver compensation unit 12. Transmitter-receiver overall characteristics are characteristics of a combination of the transmitter overall characteristics and the receiver overall characteristics.

Subsequently, basic operation of the optical transmission characteristics compensating system according to the present embodiment will be described.

[Step 1]

The PAPR calculation unit 9 calculates the PAPR of the output signal from the transmitter compensation unit 8. The transmitter compensation characteristics setting unit 10 calculates transmitter compensation characteristics with which the PAPR becomes equal to or smaller than the predetermined value, and sets the transmitter compensation characteristics to the transmitter compensation unit 8. Accordingly, the PAPR of the output signal from the transmitter compensation unit 8 becomes equal to or smaller than the predetermined value, and a non-linear effect at the optical transmitter 3 at the next stage is suppressed. Thus, the transmitter compensation characteristics in this case can be regarded as non-linear suppression compensation characteristics. Note that, the non-linear effect is suppressed even when the PAPR becomes equal to or larger than the predetermined value by adjustment with a BER in Step 3 but is set close to the predetermined value. However, the transmitter overall characteristics of the transmitter compensation unit 8 and the optical transmitter 3 are not necessarily flattened.

Such non-linear suppression compensation characteristics can be directly calculated from the PAPR but also can be obtained by configuring flat transmitter overall characteristics and then superimposing, on the transmitter compensation characteristics at that time, additional characteristics (non-linear suppression characteristics) for suppressing a non-linear effect. The non-linear suppression characteristics basically need to be able to suppress high-frequency band characteristics and are, for example, Gaussian characteristics, super Gaussian characteristics, the transmission characteristics of the optical transmitter 3 averaged by removing a ripple component thereof, or a combination thereof. Note that, all or some compensation characteristics of the optical fiber transmission path 1 may be superimposed on the transmitter compensation characteristics of the transmitter compensation unit 8 as long as a setting condition of the PAPR is satisfied (as long as a desired non-linear suppression can be obtained).

[Step 2]

The receiver compensation characteristics setting unit 13 adjusts the receiver compensation characteristics of the receiver compensation unit 12 so that transmission characteristics of the output signal from the receiver compensation unit 12 become predetermined characteristics. Specifically, receiver compensation characteristics with which the transmitter-receiver overall characteristics that are characteristics of a combination of the transmitter compensation unit 8, the optical transmitter 3, the optical receiver 5, and the receiver compensation unit 12 become flat characteristics are calculated and set to the receiver compensation unit 12. This receiver compensation characteristics are obtained by, for example, superimposing inverse characteristics of a difference (equivalent to the additional characteristics for suppressing a non-linear effect in Step 1) from conventional characteristics of the transmitter compensation characteristics on conventional reception compensation characteristics that normally make flat the receiver overall characteristics.

Note that, characteristics that lift an amplitude component at a frequency corresponding to ½ of a baud rate may be further added to the receiver compensation characteristics. Accordingly, the transmitter-receiver overall characteristics become characteristics that lift characteristics of a frequency band corresponding to ½ of the baud rate, and thus a signal component for clock regeneration increases, and clock regeneration of the baud rate can be fast and accurately performed at the reception device 4.

[Step 3]

After the compensation characteristics of the transmitter compensation unit 8 and the receiver compensation unit 12 are set, the signal quality measurement unit 11 measures bit error rate (BER) characteristics as a signal quality. The BER characteristics can be easily obtained can by, for example, inputting a known random signal from the transmission device 2 and comparing the signal with an output from the signal processing unit 15. The BER characteristics for an optical-signal-to-noise ratio (OSNR) can be obtained by changing an output from the optical transmitter 3 and changing an input to the optical receiver 5. Note that, measurements of the BER characteristics are not limited to the above-described method, but various kinds of methods are applicable. The signal quality compared with is not limited to the BER characteristics, but the OSNR itself, optical-signal-to-(noise+distortion), or an index such as a Q value indicating the signal quality may be measured and compared with a predetermined value. The distortion includes distortion due to a non-linear effect. This is same in the following description of the BER characteristics.

The measured BER characteristics are compared with a predetermined OSNR, and the transmitter compensation characteristics at the transmitter compensation characteristics setting unit 10 are adjusted as described below. When an OSNR with which a predetermined bit error rate (predetermined signal quality) is obtained for the output signal from the receiver compensation unit 12 is larger than the predetermined OSNR, in other words, when there is an allowance for the OSNR, the transmitter compensation characteristics set to the transmitter compensation characteristics setting unit 10 are adjusted to decrease the PAPR of an output from the transmitter compensation unit 8. Subsequently, the receiver compensation characteristics of the receiver compensation unit 12 are calculated in Step 2. This can be performed until the OSNR with which the predetermined bit error rate is obtained becomes equal to the predetermined OSNR. Accordingly, the PAPR can be decreased within the allowance of the OSNR, and the non-linear effect of the optical transmitter 3 can be further reduced. When the OSNR with which the predetermined bit error rate is obtained is smaller than the predetermined OSNR, in other words, when a desired bit error rate is not satisfied, the transmitter compensation characteristics set to the transmitter compensation characteristics setting unit 10 are adjusted to increase the PAPR of the output signal from the transmitter compensation unit 8. Subsequently, the receiver compensation characteristics of the receiver compensation unit 12 are calculated in Step 2. This is performed until the OSNR with which the predetermined bit error rate is obtained becomes equal to the predetermined OSNR. In this case, the PAPR potentially becomes larger than a predetermined value, but improvement of the BER characteristics due to increase of the OSNR is prioritized. Suppression of the non-linear effect can be expected to some extent as long as the PAPR is set close to the predetermined value.

Figure 2:
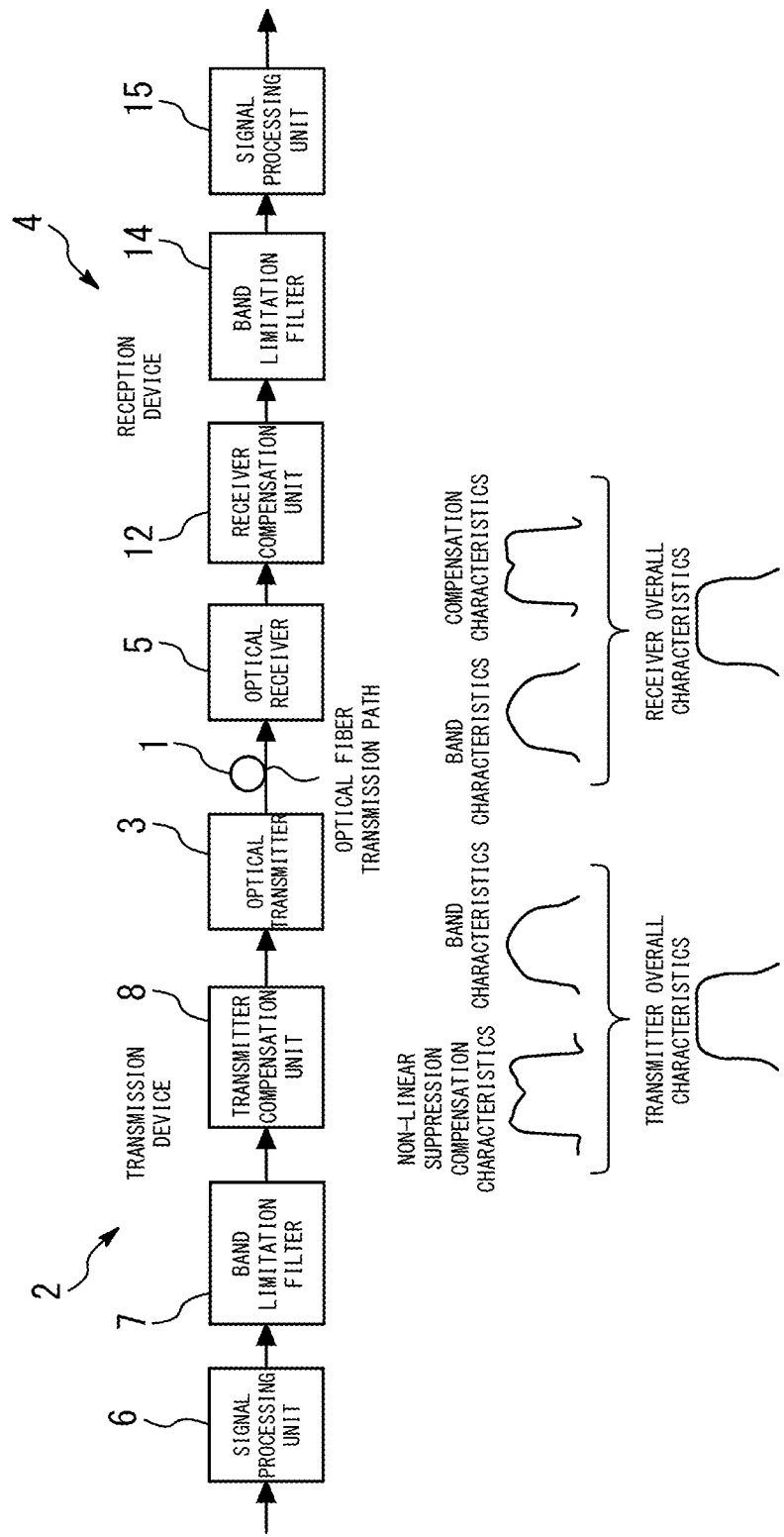
FIG. 2 is a diagram illustrating an optical transmission characteristics compensating system according to the comparative example.

Subsequently, effects of the present embodiment will be described in comparison with a comparative example. FIG. 2 is a diagram illustrating an optical transmission characteristics compensating system according to the comparative example. In the comparative example, band characteristics of the optical transmitter 3 are compensated by the compensation characteristics of the transmitter compensation unit 8, and the transmitter overall characteristics of the transmission device 2 is flat characteristics. Band characteristics of the optical receiver 5 are compensated by the compensation characteristics of the receiver compensation unit 12, and the receiver overall characteristics of the reception device 4 are flat characteristics. In this case, the compensation characteristics of the transmitter compensation unit 8 with which the transmitter overall characteristics are flat characteristics are referred to as "conventional transmitter compensation characteristics", and the compensation characteristics of the receiver compensation unit 12 with which the receiver overall characteristics are flat characteristics are referred to as "conventional reception compensation characteristics". This applies in the following as well.

Typically, the amplitude component decreases in a high-frequency region and the transmission characteristics of the optical transmitter 3 become characteristics similar to an isosceles triangle in some cases. In addition, a ripple component generated by enhancement or attenuation of a particular frequency component due to high-frequency reflection that occurs at an impedance mismatch point existing on a signal line in the optical transmitter is added. Thus, compensation characteristics for compensating for decrease of the amplitude component at high frequency and the ripple component are set to the transmitter compensation unit 8. Accordingly, the amplitude component of the output signal from the transmitter compensation unit 8 in a high-frequency region is enhanced as pre-compensation of the optical transmitter 3. When the high-frequency component is enhanced, abrupt change occurs in the signal, and accordingly, the PAPR increases. When the signal having the increased PAPR is supplied to the optical transmitter 3, a non-linear effect occurs due to a non-linear region of the modulator or the amplifier in the optical transmitter 3, and large distortion occurs in an output waveform of the optical transmitter 3. In addition, the D/A converter has limited resolution, and thus the signal quality of a signal having a large PAPR degrades. These distortions due to the non-linear effect are difficult to ameliorate with compensation by a filter and increase of the OSNR. Thus, the non-linear effect needs to be suppressed at passing through the optical transmitter 3.

However, in the present embodiment, in Step 1, the PAPR calculation unit 9 calculates the PAPR of the output signal from the transmitter compensation unit 8 to which the conventional transmitter compensation characteristics are set. Note that, the conventional transmitter compensation characteristics can be directly calculated from the transmission characteristics of the optical receiver 5. The transmitter compensation characteristics setting unit 10 superimposes additional characteristics that prevent enhancement of the high-frequency component on the conventional transmitter compensation characteristics so that a predetermined PAPR is obtained. The additional characteristics are, for example, Gaussian characteristics. However, characteristics that further prevent enhancement of the high-frequency component may be super Gaussian characteristics (including characteristics as the square of the Gaussian characteristics) having higher freedom of a band shape than the Gaussian characteristics. For example, the super Gaussian characteristics are represented by the following equation:

$$f(x)=\exp\{-(\log 2/2)*(x/Bw)^{\wedge}(2*\mathrm{order})\}$$

where x is a variable related to frequency, Bw is a 3-dB band, "order" is order. Alternatively, the additional characteristics may be characteristics obtained by averaging a ripple part of the transmission characteristics of the optical transmitter 3.

Superimposition of the additional characteristics decreases amplitude characteristics in the high-frequency region in the transmitter compensation characteristics of the transmitter compensation unit 8 according to the present embodiment as compared to the conventional transmitter compensation characteristics of the transmitter compensation unit 8 of the comparative example. In addition, also in the transmitter overall characteristics, the amplitude characteristics in the high-frequency region decrease as compared to flat characteristics of the comparative example. Accordingly, it is possible to prevent a non-linear effect from occurring in the optical transmitter 3 and degrading the transmission characteristics thereof. Note that, all or some compensation characteristics of the optical fiber transmission path 1 may be superimposed on the transmitter compensation characteristics as long as the setting condition of the PAPR is satisfied.

The additional characteristics (non-linear suppression characteristics) are not compensated at the transmitter compensation unit 8 as described above, and thus the corresponding part needs to be compensated by the receiver compensation unit 12. Specifically, characteristics obtained by superimposing inverse characteristics of additional characteristics of the transmission device 2 on the conventional reception compensation characteristics that flatten the receiver overall characteristics are set to the receiver compensation unit 12 of the reception device 4. For example, when the additional characteristics of the transmission device 2 are the Gaussian characteristics, the inverse characteristics thereof are characteristics obtained by increasing the amplitude characteristics in the high-frequency region.

In a case of the super Gaussian characteristics, the amplitude characteristics in the high-frequency region further increase. Note that, when a compensation amount of the receiver compensation characteristics in the high-frequency region is increased, no non-linear effect due to a large PAPR like the transmission device 2 potentially occurs since a stage subsequent to the receiver compensation unit 12 is a digital processing unit. With this receiver compensation, the transmitter-receiver overall characteristics of the entire transmission and reception can be made flat characteristics.

However, as a result of verification, it was found that a configuration in which characteristics not compensated at the transmitter compensation unit 8 are compensated at the reception device 4 as described above causes another problem. With the above-described configuration, since the additional characteristics are not compensated at the transmitter compensation unit 8, a non-compensated part of the transmission characteristics of the optical transmitter 3 is transmitted to the reception device 4. Specifically, the non-compensated part is forwarded to the reception device 4 in a state in which the amplitude characteristics in the high-frequency region are low in the spectrum of an output signal from the optical transmitter 3. In the reception device 4, the compensation amount in the high-frequency region is increased at the receiver compensation unit 12 to compensate the characteristics not compensated at the transmitter compensation unit 8. In this case, typically, noise caused by an amplifier and the like is added at the reception device 4, and thus the component in the high-frequency region increases for the noise as well. Accordingly, the OSNR on an output side of the receiver compensation unit 12 degrades as compared to a case in which a waveform is completely compensated at the transmission device 2. When a characteristic part added to the receiver compensation characteristics is enhanced in a case in which the noise has large influence as in long-distance transmission, in particular, the OSNR degrades and a sufficient compensation effect is not obtained in some cases, which was found by experimental verification. In addition, when the compensation amount at the reception device 4 is increased, a compensating range increases, and resolution (ENOB) may degrade for the same number of quantization bits for the compensating range in some cases. Thus, optimum compensation characteristics are not obtained in some cases only by setting, to the transmitter compensation unit 8, non-linear suppression compensation characteristics with which the PAPR becomes equal to or smaller than the predetermined value and setting the receiver compensation characteristics so that the transmitter-receiver overall characteristics become flat at the reception device 4.

Thus, as Step 3 in addition to Steps 1 and 2 at which the characteristics not compensated at the transmitter compensation unit 8 are compensated at the receiver compensation unit 12, it is needed to measure the BER at the reception device 4 and obtain an optimum solution for the compensation characteristics of the transmitter and the receiver when the BER is best. A specific method therefor will be described below.

Typically, a high signal quality (signal-to-(noise+distortion)) is requested in a high multiple-value modulation scheme used for large-capacity transmission over short distance. In this case, degradation of the signal quality (signal-to-(noise+distortion)) due to, for example, a non-linear effect attributable to the PAPR of the transmission device 2 has larger influence than degradation of the OSNR attributable to amplified spontaneous emission (ASE) of a transmission path. However, in a relatively low multiple-value modulation scheme that is suitable for long-distance transmission, degradation of the OSNR of the reception device 4 has larger influence than the non-linear effect due to the PAPR of the transmission device 2. Thus, when there is an allowance for the predetermined OSNR, short-distance transmission is considered, and the transmitter compensation characteristics are adjusted to further suppress the non-linear effect due to the PAPR. When there is no unsatisfaction nor allowance for the predetermined OSNR, long-distance transmission is considered, and the transmitter compensation characteristics are adjusted to relax suppression of the non-linear effect due to the PAPR. The PAPR potentially becomes larger than the predetermined value, but improvement of the OSNR is prioritized. In this case as well, suppression of the non-linear effect can be expected to some extent as long as the PAPR is set close to the predetermined value. As a result, it is possible to set an optimum situation in which the non-linear effect is reduced as much as possible and degradation of the OSNR is prevented as much as possible. In any case, the receiver compensation characteristics are adjusted through execution of Step 2.

As described above, in the present embodiment, the transmitter compensation characteristics of the transmitter compensation unit 8 are set so that the PAPR of the output signal from the transmitter compensation unit 8 becomes equal to or smaller than the predetermined value. Accordingly, it is possible to prevent a non-linear effect from occurring in the optical transmitter 3 and degrading the transmission characteristics thereof.

When the OSNR with which the predetermined bit error rate is obtained for the output signal from the receiver compensation unit 12 is larger than the predetermined value, in other words, when there is an allowance for the OSNR, the transmitter compensation characteristics are adjusted to decrease the PAPR of the output signal from the transmitter compensation unit 8. When the OSNR with which the predetermined bit error rate is obtained is smaller than the predetermined value, in other words, when a desired bit error rate is not satisfied, the transmitter compensation characteristics are adjusted to increase the PAPR of the output signal from the transmitter compensation unit 8. Accordingly, the PAPR and the OSNR can be both optimized to obtain optimum BER characteristics.

Note that, a method of initially performing optimization based on the BER is available as a method of setting the transmitter compensation characteristics and the receiver compensation characteristics, but initial set values are unknown, and thus an extremely large adjustment amount and an extremely long adjustment time are needed. Thus, the transmitter compensation characteristics and the receiver compensation characteristics are initially set based on a predetermined PAPR, and thereafter, the compensation characteristics are optimized based on the BER. Accordingly, it is possible to reduce an adjustment amount and an adjustment time for optimization.

Examples of methods of setting the transmitter compensation characteristics of the transmitter compensation unit 8 include a method of superimposing non-linear suppression characteristics (for example, the Gaussian characteristics, the super Gaussian characteristics, or averaged characteristics; but not limited thereto) on the conventional transmitter compensation characteristics when non-linear suppression is not considered, and a method of directly calculating the transmitter compensation characteristics as non-linear suppression compensation characteristics.

Examples of methods of setting the receiver compensation characteristics of the receiver compensation unit 12 include a method of superimposing non-linear suppression characteristics or inverse characteristics of optical equalization residue characteristics on the conventional reception compensation characteristics when non-linear suppression at the transmission device 2 is not considered, and a method of calculating the receiver compensation characteristics by using a transmitter/receiver transfer function estimation system disclosed in PTL 5. In the latter method, when the transmitter compensation characteristics of the transmission device 2 are set, receiver compensation characteristics that make flat the transmitter-receiver overall characteristics can be easily estimated. In this case as well, it is possible to estimate transmitter compensation characteristics and receiver compensation characteristics with which not only the transmitter-receiver overall characteristics are made flat but also characteristics of a frequency band corresponding to ±baud rate/2 are lifted.

Note that, examples of methods of setting the "predetermined value" of the PAPR include an experimental method and a SIM method as follows. In the experimental method, first, with a configuration in which a transmitter and a receiver are directly connected, a signal in which each non-linear suppression characteristic and transmitting-side pre-equalization are superimposed on a desired modulation format is input, and the non-linear suppression characteristics are changed to change the PAPR, thereby acquiring the signal quality. Subsequently, with a configuration in which an optical transmitter and an optical receiver are connected through a transmission path, a receiving OSNR is calculated or measured based on a fiber propagation loss, an optical amplifier NF, a span number, and the like. A PAPR value when allowed signal quality characteristics are determined based on these pieces of information is set as the "predetermined value" of the PAPR. In the SIM method, first, with a simulation model of DAC performance (bandwidth and resolution), a signal in which each non-linear suppression characteristic and transmitting-side pre-equalization are superimposed on a desired modulation format is input, and the non-linear suppression characteristics are changed to change the PAPR, thereby acquiring the signal quality. Subsequently, with a configuration in which an optical transmitter and an optical receiver are connected through a transmission path, a receiving OSNR is calculated or measured based on a fiber propagation loss, an optical amplifier NF, a span number, and the like. A PAPR value when allowed signal quality characteristics are determined based on these pieces of information is set as the "predetermined value" of the PAPR.

Embodiment 2

Figure 3:
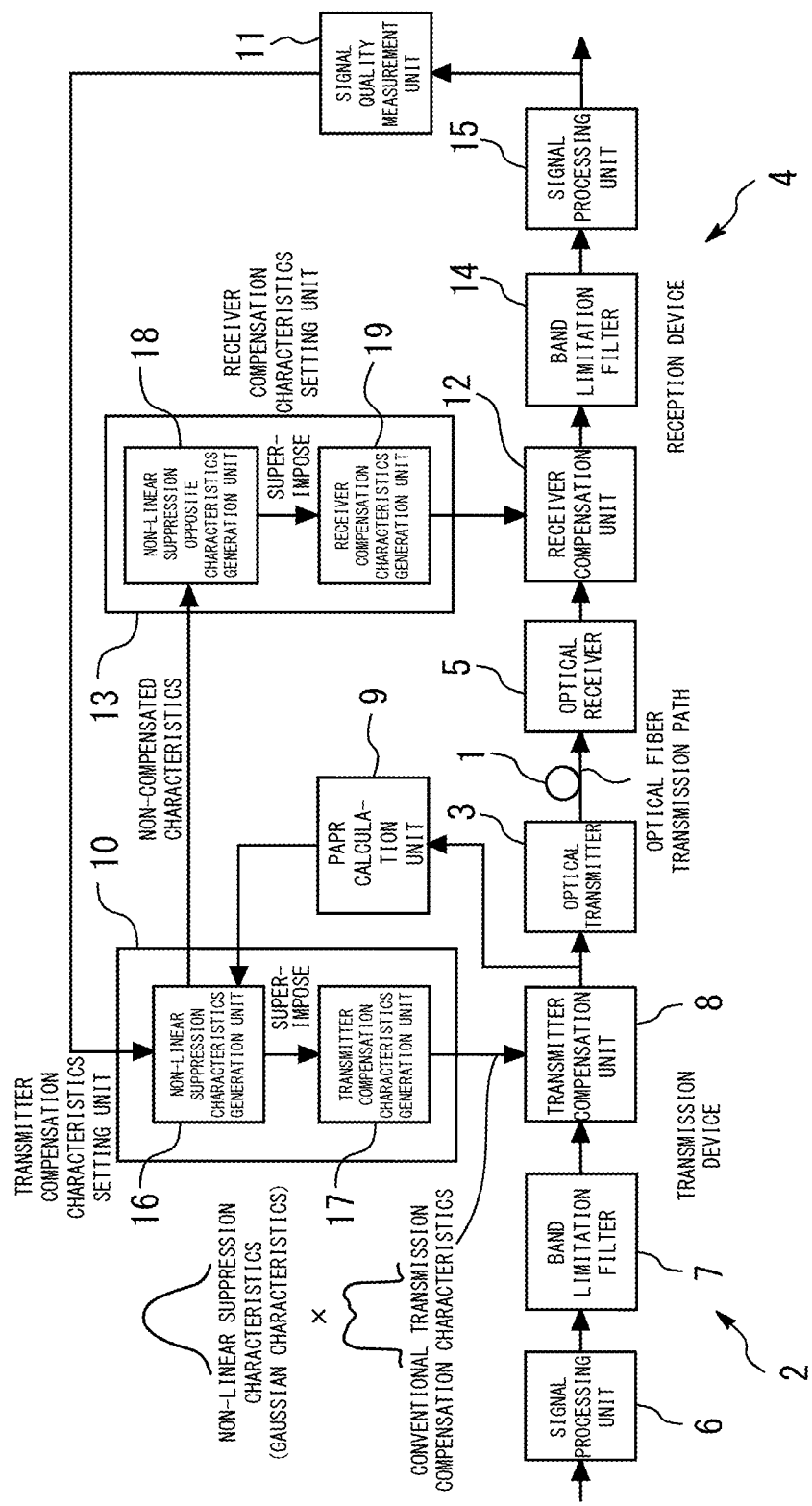
FIG. 3 is a diagram illustrating an optical transmission characteristics compensating system according to Embodiment 2.

FIG. 3 is a diagram illustrating an optical transmission characteristics compensating system according to Embodiment 2. In the present embodiment, the transmitter compensation characteristics setting unit 10 includes a non-linear suppression characteristics generation unit 16 and a transmitter compensation characteristics generation unit 17. The receiver compensation characteristics setting unit 13 includes a non-linear suppression inverse characteristics generation unit 18 and a receiver compensation characteristics generation unit 19. The rest of the configuration is same as that of Embodiment 1.

The non-linear suppression characteristics generation unit 16 of the transmission device 2 generates non-linear suppression characteristics with which the PAPR of the output signal from the transmitter compensation unit 8 is smaller than the predetermined value. The transmitter compensation characteristics generation unit 17 superimposes the non-linear suppression characteristics on the conventional transmitter compensation characteristics and sets the resulting characteristics to the transmitter compensation unit 8.

The non-linear suppression inverse characteristics generation unit 18 of the reception device 4 generates non-linear suppression inverse characteristics that are inverse characteristics of the non-linear suppression characteristics generated at the transmission device 2. The receiver compensation characteristics generation unit 19 superimposes the non-linear suppression inverse characteristics on the conventional reception compensation characteristics and sets the resulting characteristics to the receiver compensation unit 12.

Subsequently, operation of the system according to the present embodiment will be described. First, the transmission characteristics of the optical transmitter 3 are measured to calculate conventional transmitter compensation characteristics for compensating the transmission characteristics. Subsequently, the PAPR calculation unit 9 calculates the PAPR of the output signal from the transmitter compensation unit 8. The PAPR may be directly calculated from the output signal from the transmitter compensation unit 8 or may be calculated from the measured transmission characteristics of the optical transmitter 3 or the conventional transmitter compensation characteristics. In this case, the clipping rate of the D/A converter in the optical transmitter 3 can be considered as well.

Subsequently, the non-linear suppression characteristics generation unit 16 generates non-linear suppression characteristics with which the PAPR becomes equal to or smaller than the predetermined value. For example, the Gaussian characteristics can be used as the non-linear suppression characteristics. In this case, an average value and a standard deviation included in the Gaussian characteristics are determined so that the PAPR becomes equal to or smaller than the predetermined value. Note that, the non-linear suppression characteristics do not need to be limited to the Gaussian characteristics but may be any characteristics that can suppress characteristics in the high-frequency region. For example, the super Gaussian characteristics having further abrupt characteristics, or characteristics obtained by averaging ripples of the transmission characteristics of the optical transmitter 3 is also applicable.

Subsequently, the transmitter compensation characteristics generation unit 17 generates non-linear suppression compensation characteristics by superimposing the non-linear suppression characteristics on the conventional transmitter compensation characteristics set to the transmitter compensation unit 8, and sets the non-linear suppression compensation characteristics to the transmitter compensation unit 8. Accordingly, the PAPR of the output signal from the transmitter compensation unit 8 can be made equal to or smaller than the predetermined value, and the non-linear effect at the optical transmitter 3 can be suppressed. However, the transmission characteristics of the optical transmitter 3 are not completely compensated, but characteristics not compensated at the transmitter compensation unit 8 are transmitted to the reception device 4. The characteristics not compensated at the transmitter compensation unit 8 correspond to the non-linear suppression characteristics.

Subsequently, the receiver compensation unit 12 compensates the characteristics not compensated at the transmitter compensation unit 8 together with the band characteristics of the optical receiver 5. In this case, non-linear suppression inverse characteristics that are inverse characteristics of the non-linear suppression characteristics of the transmission device 2 are generated to compensate the characteristics not compensated at the transmitter compensation unit 8. The receiver compensation characteristics generation unit 19 generates receiver compensation characteristics by superimposing the non-linear suppression inverse characteristics on the conventional reception compensation characteristics (compensation characteristics of a band characteristics of the optical fiber transmission path 1 and the band characteristics of the optical receiver 5), and sets the receiver compensation characteristics to the receiver compensation unit 12.

After the compensation characteristics of the transmitter compensation unit 8 and the receiver compensation unit 12 are set, the BER is measured and the non-linear suppression characteristics are adjusted with reference to a current set value, thereby determining the non-linear suppression characteristics with which the BER characteristics are optimum. Accordingly, effects same as those of Embodiment 1 can be obtained.

Embodiment 3

Figure 4:
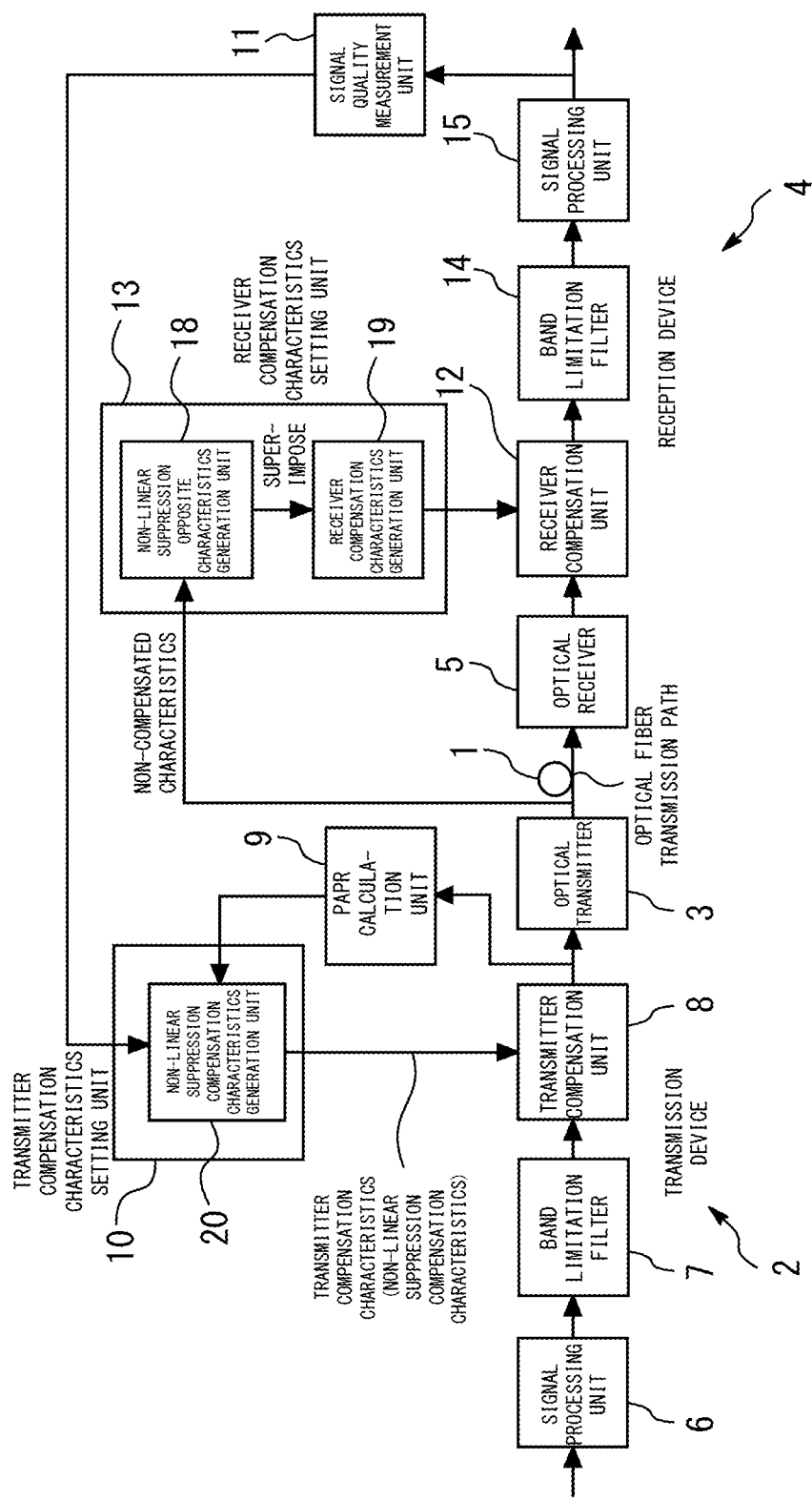
FIG. 4 is a diagram illustrating an optical transmission characteristics compensating system according to Embodiment 3.

FIG. 4 is a diagram illustrating an optical transmission characteristics compensating system according to Embodiment 3. In the present embodiment, unlike Embodiment 2, the transmitter compensation characteristics setting unit 10 includes a non-linear suppression compensation characteristics generation unit 20. The non-linear suppression compensation characteristics generation unit 20 directly generates non-linear suppression compensation characteristics with which the PAPR of the output signal from the transmitter compensation unit 8 becomes smaller than the predetermined value, and sets the non-linear suppression compensation characteristics to the transmitter compensation unit 8. The non-linear suppression compensation characteristics correspond to the conventional transmitter compensation characteristics on which the non-linear suppression characteristics are superimposed in Embodiment 2. The rest of the configuration and operation are same as those of Embodiment 2, and effects same as those of Embodiments 1 and 2 can be obtained.

Embodiment 4

Figure 5:
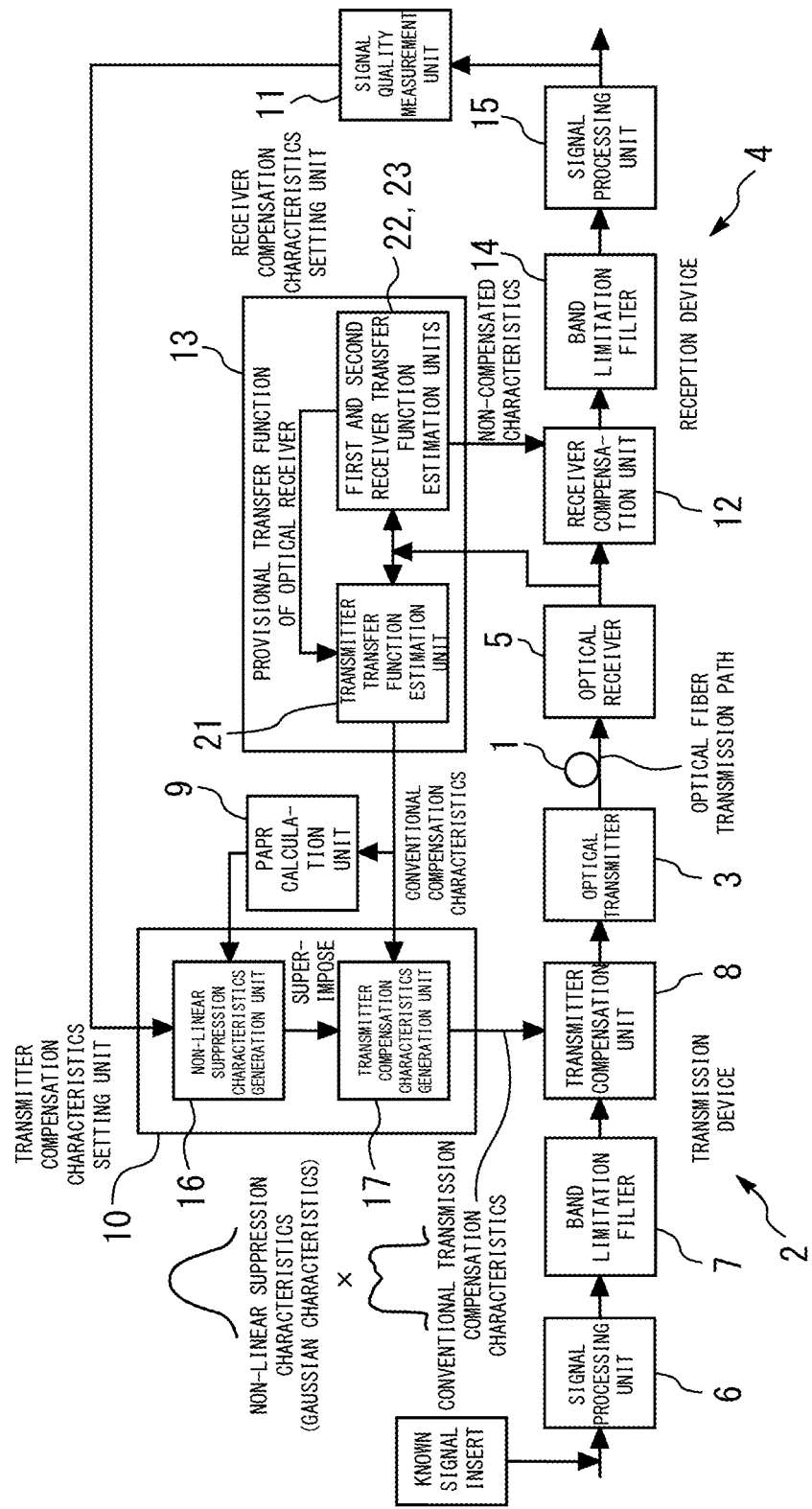
FIG. 5 is a diagram illustrating an optical transmission characteristics compensating system according to Embodiment 4.

FIG. 5 is a diagram illustrating an optical transmission characteristics compensating system according to Embodiment 4. In the present embodiment, unlike Embodiment 2, the receiver compensation characteristics setting unit 13 includes a transmitter transfer function estimation unit 21 and first and second receiver transfer function estimation units 22 and 23.

A transmitter transfer function estimation unit and first and second receiver transfer function estimation units of an optical transmission characteristics estimating system of Japanese Patent No. 6319487 may be used as the transmitter transfer function estimation unit 21 and the first and second receiver transfer function estimation units 22 and 23, respectively. In other words, the first receiver transfer function estimation unit 22 estimates a provisional transfer function of the optical receiver 5 by performing Fourier transform of data output from the optical receiver 5 when a test signal having a known spectrum is input to an input end of the optical receiver 5, and calculates a provisional inverse transfer function of the optical receiver 5 by calculating the reciprocal of the provisional transfer function of the optical receiver 5. When the transmitter transfer function estimation unit 21 transmits a first known signal from the transmission device 2 to the reception device 4, compensation of transmission path characteristics and compensation of transfer characteristics of the optical receiver 5 are performed at the reception device 4, and influence of a transfer function of the optical transmitter 3 remains in the first known signal. The transfer function or inverse transfer function of the optical transmitter 3 is estimated as filter coefficients of a digital filter when the first known signal is input to the digital filter and converged so that its error from the original first known signal is minimized. The compensation of the transfer characteristics of the optical receiver 5 for the first known signal is performed by using the provisional inverse transfer function of the optical receiver 5. The second receiver transfer function estimation unit 23 estimates a transfer function or inverse transfer function of the optical receiver 5 as filter coefficients of a digital filter when a second known signal transmitted from the transmission device 2 to the reception device 4 is input into the digital filter and converged to minimize an error between an output from the digital filter and a signal obtained by adding the estimated transfer function or inverse transfer function of the optical transmitter 3 and the transmission path characteristics to the original second known signal.

Subsequently, operation of the system according to the present embodiment will be described. First, the first receiver transfer function estimation unit 22 estimates the provisional transfer function of the optical receiver 5. The transmitter transfer function estimation unit 21 estimates the transfer function or inverse transfer function of the optical transmitter 3 by using the provisional transfer function of the optical receiver 5 and calculates conventional compensation characteristics of the optical transmitter 3 based on the transfer function or inverse transfer function. The PAPR calculation unit 9 calculates the PAPR of the output signal from the transmitter compensation unit 8 based on the conventional transmitter compensation characteristics. Similarly to Embodiment 2, the non-linear suppression characteristics generation unit 16 generates non-linear suppression characteristics with which the PAPR becomes smaller than the predetermined value, and the transmitter compensation characteristics generation unit 17 superimposes the non-linear suppression characteristics on the conventional transmitter compensation characteristics and sets the resulting characteristics to the transmitter compensation unit 8.

The second receiver transfer function estimation unit 23 calculates receiver compensation characteristics with which the transmitter-receiver overall characteristics become flat characteristics, and sets the receiver compensation characteristics to the receiver compensation unit 12. However, the characteristics (non-linear suppression characteristics) not compensated at the transmitter compensation unit 8 are transmitted to the reception device 4, and the second receiver transfer function estimation unit 23 calculates the receiver compensation characteristics with reference to the transmitted characteristics as well. The rest of the configuration and operation are same as those of Embodiment 2.

In the present embodiment, since the conventional transmitter compensation characteristics of the transmitter compensation unit 8 and the receiver compensation characteristics of the receiver compensation unit 12 are calculated by an existing system, a new system does not need to be established unlike Embodiments 2 and 3, and adjustment of the non-linear suppression characteristics can be more easily performed. In addition, effects same as those of Embodiments 1 and 2 can be obtained.

Embodiment 5

Figure 6:
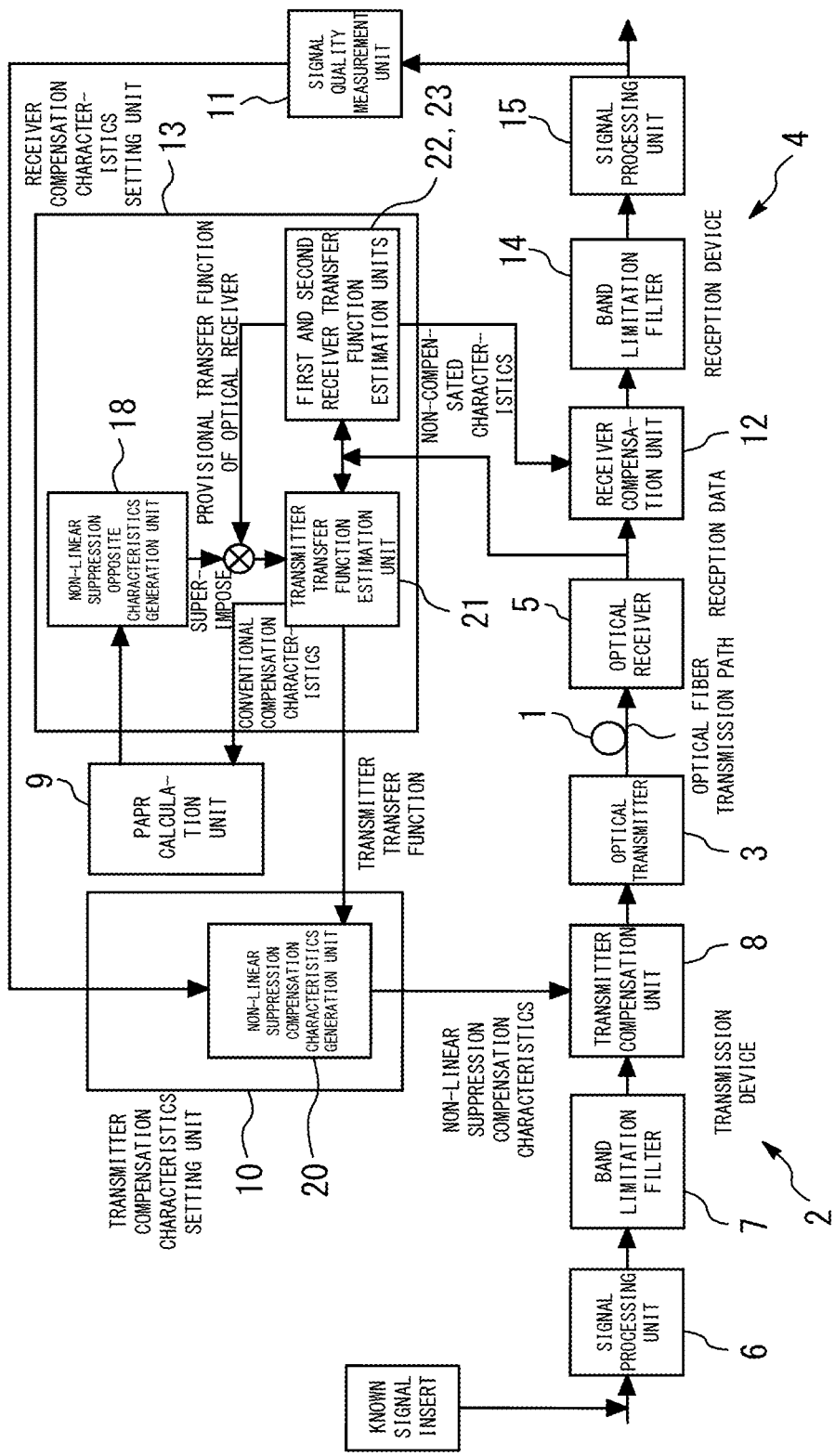
FIG. 6 is a diagram illustrating an optical transmission characteristics compensating system according to Embodiment 5.

FIG. 6 is a diagram illustrating an optical transmission characteristics compensating system according to Embodiment 5. In the present embodiment, unlike Embodiment 4, the transmitter compensation characteristics setting unit 10 includes the non-linear suppression compensation characteristics generation unit 20. The receiver compensation characteristics setting unit 13 further includes the non-linear suppression inverse characteristics generation unit 18. The rest of the configuration is same as that of Embodiment 4.

Similarly to Embodiment 4, the transmitter transfer function estimation unit 21 calculates the conventional compensation characteristics of the optical transmitter 3. The PAPR calculation unit 9 calculates the PAPR of the output signal from the transmitter compensation unit 8 based on the conventional transmitter compensation characteristics. The non-linear suppression inverse characteristics generation unit 18 generates non-linear suppression characteristics with which the PAPR becomes smaller than the predetermined value, and generates non-linear suppression inverse characteristics that are inverse characteristics of the non-linear suppression characteristics. The transmitter transfer function estimation unit 21 estimates a transmitter transfer function of the optical transmitter 3 by using the provisional transfer function of the optical receiver 5 on which the non-linear suppression inverse characteristics are superimposed. This transmitter transfer function is a transfer function that is calculated only by using the provisional transfer function and on which the non-linear suppression characteristics are superimposed. The non-linear suppression compensation characteristics generation unit 20 sets the estimated optical transmitter transfer function to the transmitter compensation unit 8 as non-linear suppression compensation characteristics.

For example, the optical transmitter transfer function can be obtained by, instead of superimposing the non-linear suppression inverse characteristics on the provisional transfer function of the optical receiver 5, superimposing the non-linear suppression inverse characteristics on a known signal input from the transmission device 2 or reception data acquired from the optical receiver 5. In this manner, the transmitter transfer function on which the non-linear suppression characteristics are superimposed can be easily obtained by superimposing the non-linear suppression inverse characteristics on a predetermined parameter of an optical transmission characteristics estimating system.

In the present embodiment, since the conventional transmitter compensation characteristics of the transmitter compensation unit 8 and the receiver compensation characteristics of the receiver compensation unit 12 are calculated by an existing system, a new system does not need to be established unlike Embodiments 2 and 3, and adjustment of the non-linear suppression characteristics can be more easily performed. In addition, effects same as those of Embodiments 1 and 2 can be obtained.

Embodiment 6

Figure 7:
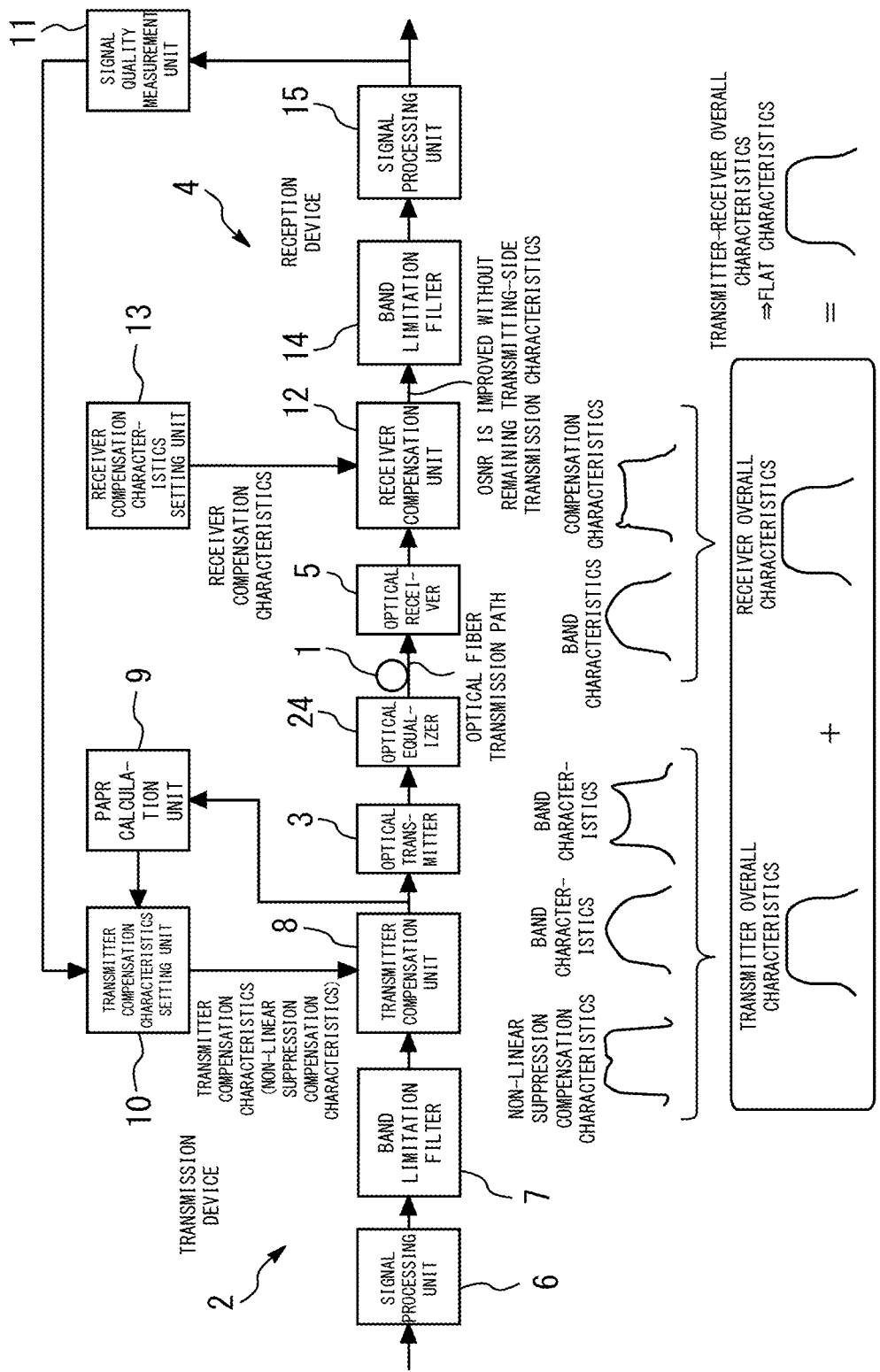
FIG. 7 is a diagram illustrating an optical transmission characteristics compensating system according to Embodiment 6.

FIG. 7 is a diagram illustrating an optical transmission characteristics compensating system according to Embodiment 6. In the present embodiment, unlike Embodiment 1, an optical equalizer 24 is provided at a stage subsequent to the optical transmitter 3. Similarly to Embodiment 1, the non-linear suppression characteristics are superimposed on the conventional transmitter compensation characteristics so that the PAPR of the output from the transmitter compensation unit 8 becomes equal to the predetermined value, and the resulting characteristics are set to the transmitter compensation unit 8 as the non-linear suppression compensation characteristics. In other words, the transmitter compensation unit 8 performs only part of compensation of the transmission characteristics of the optical transmitter 3, and the non-linear suppression characteristics are excluded from compensation of the optical transmitter 3 and not compensated at the transmitter compensation unit 8.

The optical equalizer 24 includes, for example, an optical filter, and transmission characteristics of the optical filter are designed so that transmission characteristics of an output signal from the optical equalizer 24 become flat. The optical equalizer 24 is a device (optical filter) integrated with the modulator in the optical transmitter 3. Alternatively, in a case of a transmission path that passes through a wavelength selection switch (WSS), an optical filter function of the WSS may be used.

Compensation characteristics of the optical equalizer 24 (the transmission characteristics of the optical filter) are designed to be inverse characteristics of the non-linear suppression characteristics calculated by the transmitter compensation characteristics setting unit 10. The optical equalizer 24 performs the remaining part of compensation of the transmission characteristics of the optical transmitter 3. Note that, the optical filter may be provided with band designing of a Gaussian shape, a super Gaussian shape, or inverse characteristics of each Gaussian shape. The optical fiber transmission path 1 transmits, to the optical receiver 5 of the reception device 4, an optical signal output from the optical equalizer 24 of the transmission device 2.

The transmitter overall characteristics of Embodiment 6 are characteristics with the optical equalizer 24 added as well as the transmitter compensation unit 8 and the optical transmitter 3. Although the amplitude characteristics in the high-frequency region decrease in the transmitter overall characteristics of Embodiment 1 (band characteristics of the output signal from the optical transmitter 3), the transmitter overall characteristics of Embodiment 6 are made flat by the optical equalizer 24. In other words, the amplitude characteristics in the high-frequency region are increased by the optical filter of the optical equalizer 24. For example, when the non-linear suppression characteristics are the super Gaussian characteristics, inverse characteristics of the super Gaussian characteristics are set to the optical filter of the optical equalizer 24. Typically, the optical filter can be produced, for example, by using a dielectric multi-layered film, and relatively similar characteristics can be achieved with the super Gaussian characteristics or the inverse characteristics thereof.

Since the transmitter overall characteristics of the transmission device 2 can be flattened as described above, the receiving-side OSNR can be improved as compared to Embodiment 1 in which the receiving-side OSNR degrades due to the characteristics not compensated at the transmitter compensation unit 8. Thus, the receiver compensation characteristics of the receiver compensation unit 12 can be obtained by using only the conventional reception compensation characteristics that make flat the receiver overall characteristics in Step 2.

However, the optical equalizer 24 is an analog circuit, and thus it is difficult to completely compensate the non-linear suppression characteristics in some cases, and characteristics that cannot be compensated at the optical equalizer 24 (hereinafter referred to as an optical equalization residue characteristics) are transmitted to the reception device 4. However, the optical equalization residue characteristics are smaller than the non-linear suppression characteristics. The receiver compensation unit 12 compensates the optical equalization residue characteristics together with the band characteristics of the optical receiver 5. In this case, the optical equalization residue characteristics are calculated as the difference between band characteristics of the output signal from the optical equalizer 24 and flat characteristics. Then, the receiver compensation characteristics generation unit 19 generates optical equalization residue inverse characteristics, superimposes the optical equalization residue inverse characteristics on the conventional reception compensation characteristics (compensation characteristics of the band characteristics of the optical fiber transmission path 1 and the band characteristics of the optical receiver 5), and sets the resulting characteristics to the receiver compensation unit 12.

Similarly to Embodiment 1, when the optical equalization residue characteristics affect the OSNR of the reception device 4, the transmitter compensation characteristics are adjusted based on a result from the signal quality measurement unit 11, and as a result, optimum transmitter compensation and receiver compensation can be performed. However, in the present embodiment, since flat characteristics are achieved at the transmission device 2, the optical equalization residue characteristics can be made significantly smaller than the characteristics not compensated at the transmitter compensation unit 8 in Embodiment 1, and thus more optimum transmitter and receiver compensation characteristics than in Embodiment 1 can be set. In addition, effects same as those of Embodiment 1 can be obtained.

In a case in which the optical equalizer 24 is inserted into an output side of the optical transmitter 3, the predetermined OSNR is more likely to be obtained than in a case in which the optical equalizer 24 is not inserted. However, when the predetermined OSNR is not obtained, improvement of the BER characteristics due to increase of the OSNR is prioritized although the PAPR is potentially slightly larger than the predetermined value. The PAPR can be set close to the predetermined value, and suppression of a non-linear effect can be expected to some extent.

Embodiment 7

Figure 8:
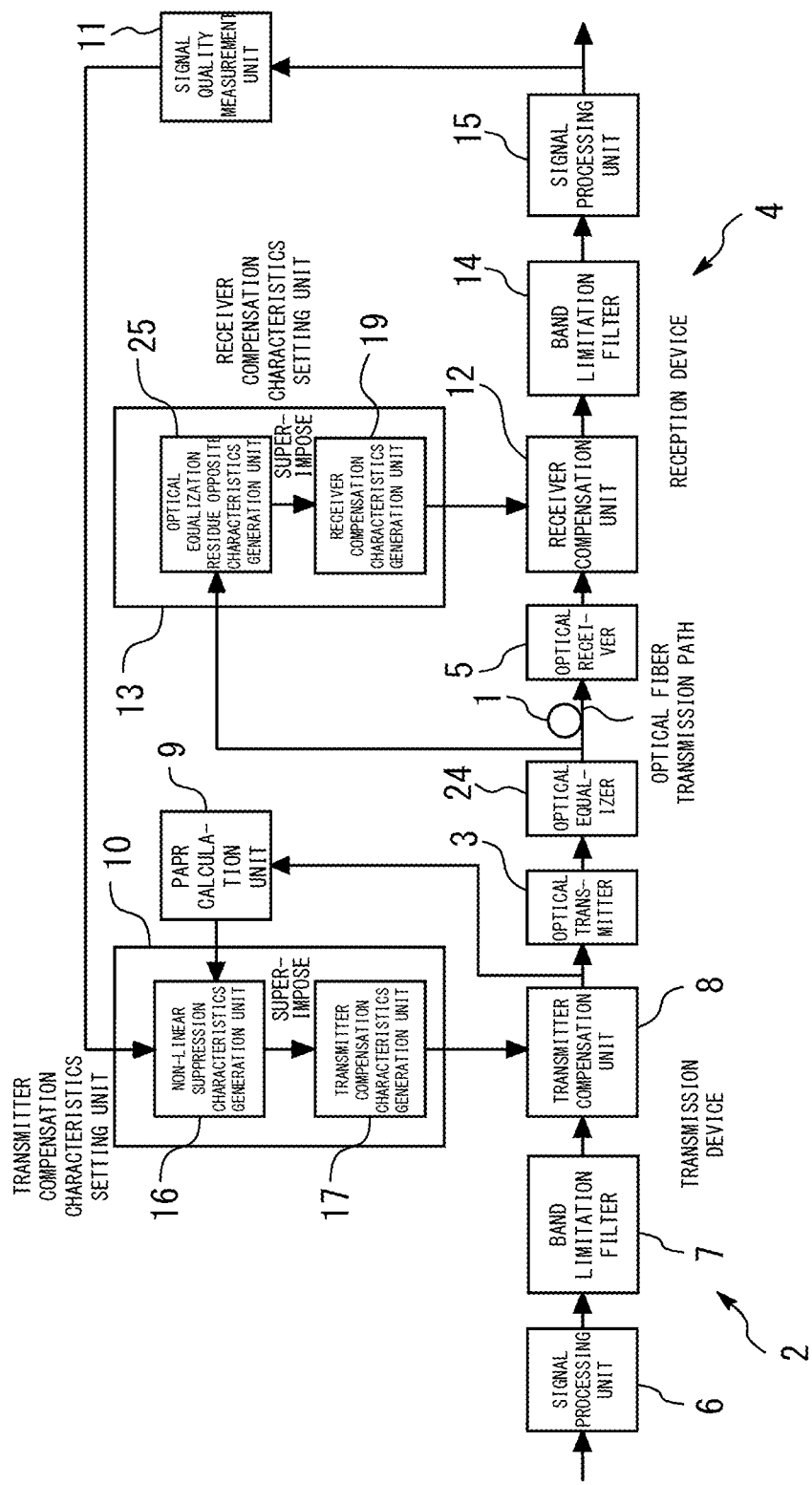
FIG. 8 is a diagram illustrating an optical transmission characteristics compensating system according to Embodiment 7.

FIG. 8 is a diagram illustrating an optical transmission characteristics compensating system according to Embodiment 7. In the present embodiment, the transmitter compensation characteristics setting unit 10 includes the non-linear suppression characteristics generation unit 16 and the transmitter compensation characteristics generation unit 17. The receiver compensation characteristics setting unit 13 includes an optical equalization residue inverse characteristics generation unit 25 and the receiver compensation characteristics generation unit 19. The rest of the configuration is same as that of Embodiment 6.

The non-linear suppression characteristics generation unit 16 of the transmission device 2 generates non-linear suppression characteristics with which the PAPR of the output signal from the transmitter compensation unit 8 becomes smaller than the predetermined value. The transmitter compensation characteristics generation unit 17 superimposes the non-linear suppression characteristics on the conventional transmitter compensation characteristics and sets the resulting characteristics to the transmitter compensation unit 8.

The non-linear suppression characteristics include the characteristics not compensated at the transmitter compensation unit 8. The non-compensated characteristics are compensated by the optical equalizer 24. When this compensation is completely performed, the band characteristics of the output signal from the optical equalizer 24 become flat. However, when the compensation by the optical equalizer 24 is incomplete, uncompensated characteristics are transmitted to the reception device 4 as the optical equalization residue characteristics. The optical equalization residue characteristics can be detected as the difference between the band characteristics of the output signal from the optical equalizer 24 and flat characteristics, and may include a compensation error at the transmitter compensation unit 8 in addition to the incompleteness at the optical equalizer 24.

The optical equalization residue inverse characteristics generation unit 25 of the reception device 4 generates optical equalization residue inverse characteristics from the above-described optical equalization residue characteristics. The receiver compensation characteristics generation unit 19 superimposes the optical equalization residue inverse characteristics on the conventional reception compensation characteristics and sets the resulting characteristics to the receiver compensation unit 12. Accordingly, effects same as those of Embodiment 6 can be obtained.

Embodiment 8

Figure 9:
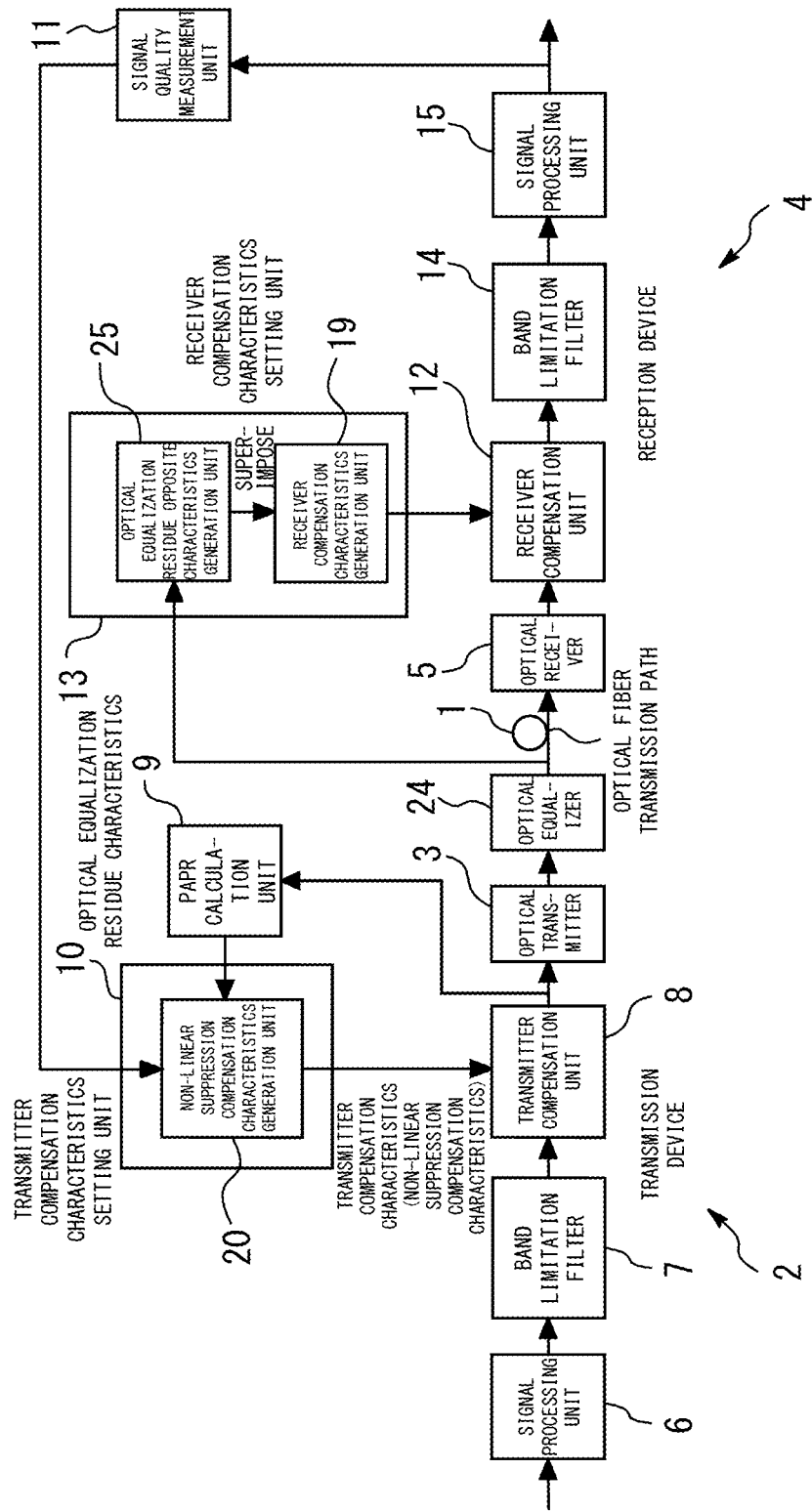
FIG. 9 is a diagram illustrating an optical transmission characteristics compensating system according to Embodiment 8.

FIG. 9 is a diagram illustrating an optical transmission characteristics compensating system according to Embodiment 8. In the present embodiment, unlike Embodiment 7, the transmitter compensation characteristics setting unit 10 includes the non-linear suppression compensation characteristics generation unit 20. The non-linear suppression compensation characteristics generation unit 20 of the transmission device 2 directly generates non-linear suppression compensation characteristics with which the PAPR of the output signal from the transmitter compensation unit 8 becomes smaller than the predetermined value, and sets the non-linear suppression compensation characteristics to the transmitter compensation unit 8. The non-linear suppression compensation characteristics correspond to the conventional transmitter compensation characteristics on which the non-linear suppression characteristics are superimposed in Embodiment 7. It is preferable that band characteristics of the optical filter of the optical equalizer 24 are designed to be inverse characteristics of the difference (equivalent to the non-linear suppression characteristics) between the non-linear suppression compensation characteristics by the non-linear suppression compensation characteristics generation unit 20 and the conventional transmitter compensation characteristics. The rest of the configuration is same as Embodiment 7, and effects same as those of Embodiments 6 and 7 can be obtained.

Embodiment 9

Figure 10:
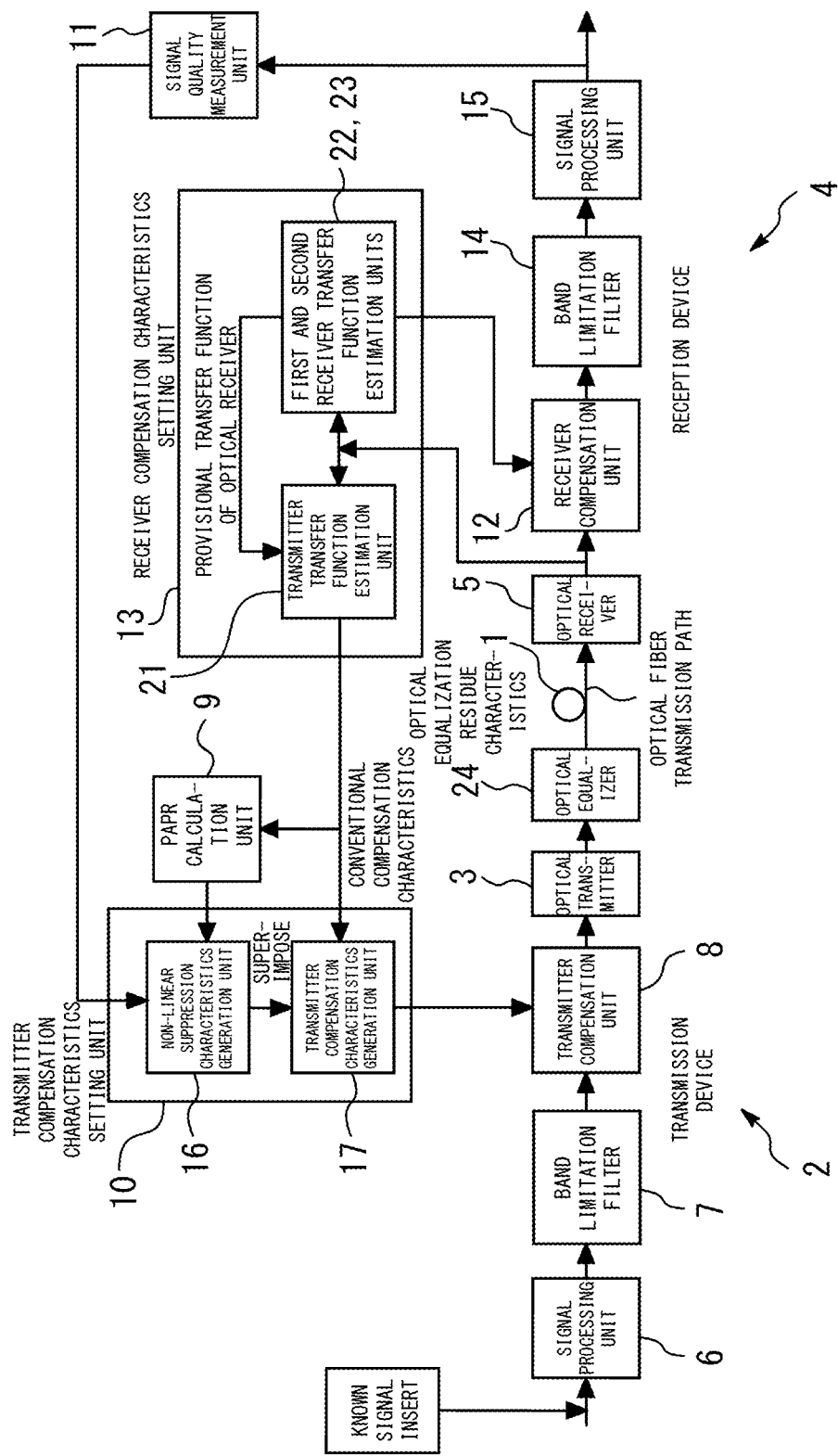
FIG. 10 is a diagram illustrating an optical transmission characteristics compensating system according to Embodiment 9.

FIG. 10 is a diagram illustrating an optical transmission characteristics compensating system according to Embodiment 9. In the present embodiment, unlike Embodiment 7, the receiver compensation characteristics setting unit 13 includes the transmitter transfer function estimation unit 21 and the first and second receiver transfer function estimation units 22 and 23. The configurations and functions of the transmitter transfer function estimation unit 21 and the first and second receiver transfer function estimation units 22 and 23 are same as those in Embodiment 4. The rest of the configuration is same as that of Embodiment 7.

Similarly to Embodiment 4, the first receiver transfer function estimation unit 22 estimates the provisional transfer function of the optical receiver 5. The transmitter transfer function estimation unit 21 estimates the transfer function or inverse transfer function of the optical transmitter 3 by using the provisional transfer function of the optical receiver 5. In this case, the conventional transmitter compensation characteristics are obtained by bypassing the optical equalizer 24. The operation of the non-linear suppression characteristics generation unit 16, the transmitter compensation characteristics generation unit 17, and the optical equalizer 24 is same as that in Embodiment 7. The second receiver transfer function estimation unit 23 estimates a transfer function as the transmission characteristics of the optical receiver 5. The estimated transfer function of the optical receiver 5 includes the optical equalization residue characteristics not compensated at the transmission device 2. The receiver compensation unit 12 compensates the optical equalization residue characteristics together with the band characteristics of the optical receiver 5.

In the present embodiment, since the conventional transmitter compensation characteristics of the transmitter compensation unit 8 and the receiver compensation characteristics of the receiver compensation unit 12 are calculated by an existing system, a new system does not need to be established unlike Embodiments 7 and 8, and adjustment of the non-linear suppression characteristics can be more easily performed. In addition, effects same as those of Embodiments 6 and 7 can be obtained.

Embodiment 10

Figure 11:
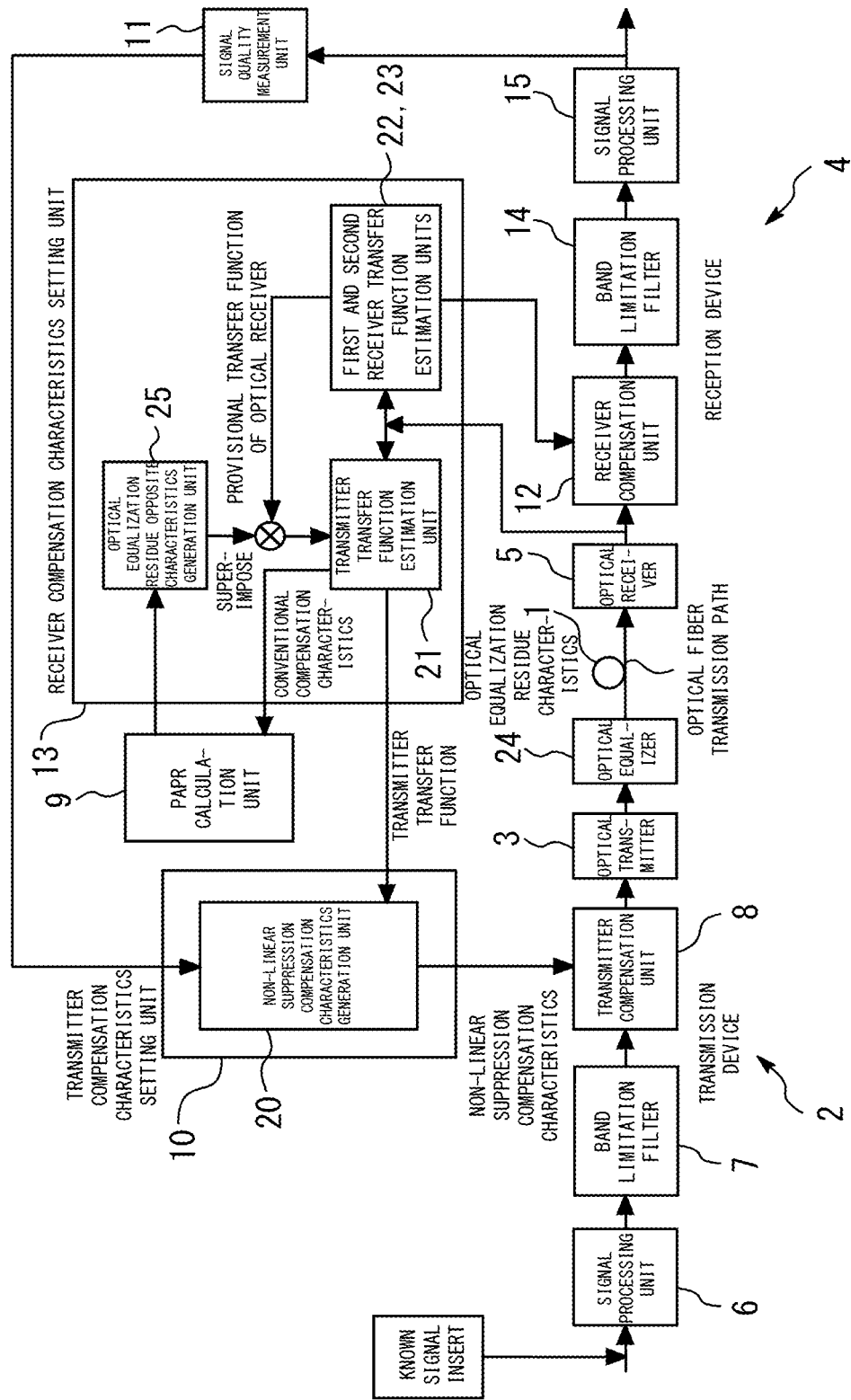
FIG. 11 is a diagram illustrating an optical transmission characteristics compensating system according to Embodiment 10.

FIG. 11 is a diagram illustrating an optical transmission characteristics compensating system according to Embodiment 10. In the present embodiment, unlike Embodiments 9, the transmitter compensation characteristics setting unit 10 includes the non-linear suppression compensation characteristics generation unit 20. The receiver compensation characteristics setting unit 13 further includes the non-linear suppression inverse characteristics generation unit 18. The rest of the configuration is same as that of Embodiment 9. The functions and operation of the receiver compensation characteristics setting unit 13 and the non-linear suppression compensation characteristics generation unit 20 are same as those in Embodiment 4. Accordingly, effects same as those of Embodiment 4 can be obtained.

In the present embodiment, since the conventional transmitter compensation characteristics of the transmitter compensation unit 8 and the receiver compensation characteristics of the receiver compensation unit 12 are calculated by an existing system, a new system does not need to be established unlike Embodiments 7 and 8, and adjustment of the non-linear suppression characteristics can be more easily performed. In addition, effects same as those in Embodiments 6 and 7 can be obtained.

Note that the phase compensation may be performed by recording a program for realizing a function of the optical transmission characteristics compensating method and the optical transmission characteristics compensating system in Embodiments 1-10 in a computer-readable recording medium, making a computer system or a programmable logic device read the program recorded in the recording medium, and executing it. Note that the "computer system" here includes an OS and hardware such as a peripheral device or the like. In addition, the "computer system" also includes a WWW system including a homepage providing environment (or display environment). Furthermore, the "computer-readable recording medium" is a portable medium such as a flexible disk, a magneto-optical disk, a ROM or a CD-ROM, or a storage device such as a hard disk built in the computer system. Further, the "computer-readable recording medium" also includes the one holding the program for a fixed period of time, such as a volatile memory (RAM) inside the computer system to be a server or a client in the case that the program is transmitted through a network such as the Internet or a communication channel such as a telephone line. In addition, the program may be transmitted from the computer system storing the program in the storage device or the like to another computer system through a transmission medium or a transmission wave in the transmission medium. Here, the "transmission medium" that transmits the program is a medium having a function of transmitting information like the network (communication network) such as the Internet or the communication channel (communication line) such as the telephone line. Furthermore, the program may be the one for realizing a part of the above-described function. Further, it may be the one capable of realizing the above-described function by a combination with the program already recorded in the computer system, that is, a so-called difference file (difference program).

REFERENCE SIGNS LIST 1 optical fiber transmission path (optical transmission path); 3 optical transmitter; 5 optical receiver; 8 transmitter compensation unit; 12 receiver compensation unit; 13 receiver compensation characteristics setting unit; 10 transmitter compensation characteristics setting unit; 24 optical equalizer (optical filter); 16 non-linear suppression characteristics generation unit; 17 transmitter compensation characteristics generation unit

The invention claimed is:

1. An optical transmission characteristics compensating method compensating transmission characteristics of an optical transmitter and an optical receiver connected with each other through an optical transmission path, comprising:
   performing part of compensation of the transmission characteristics of the optical transmitter by transmitter compensation circuitry disposed at a stage prior to the optical transmitter; and
   performing remaining part of compensation of the transmission characteristics of the optical transmitter and compensation of the transmission characteristics of the optical receiver by receiver compensation circuitry disposed at a stage subsequent to the optical receiver,
   wherein transmitter compensation characteristics of the transmitter compensation circuitry is set so that a peak-to-average-power ratio of an output signal from the transmitter compensation circuitry becomes equal to or smaller than a predetermined value.

2. The optical transmission characteristics compensating method according to claim 1, wherein
   when an optical signal to noise ratio with which predetermined signal quality is obtained for an output signal from the receiver compensation circuitry is larger than a predetermined value, the transmitter compensation characteristics are adjusted to decrease a peak-to-average-power ratio of an output signal from the transmitter compensation circuitry, and
   when the optical signal to noise ratio with which the predetermined signal quality is obtained is smaller than the predetermined value, the transmitter compensation characteristics are adjusted to increase the peak-to-average-power ratio of the output signal from the transmitter compensation circuitry.

3. The optical transmission characteristics compensating method according to claim 1, wherein any one or a combination of Gaussian characteristics, super Gaussian characteristics, and averaged characteristics of transmission characteristics of the optical transmitter are superimposed on the transmitter compensation characteristics as non-linear suppression characteristics.

4. The optical transmission characteristics compensating method according to claim 1, wherein non-linear suppression characteristics with which a peak-to-average-power ratio of an output signal from the transmitter compensation circuitry becomes equal to or smaller than a predetermined value are generated, the non-linear suppression characteristics are superimposed on compensation characteristics of the transmitter compensation circuitry, and inverse characteristics of the non-linear suppression characteristics are superimposed on compensation characteristics of the receiver compensation circuitry, or non-linear suppression compensation characteristics with which a peak-to-average-power ratio of an output signal from the transmitter compensation circuitry becomes smaller than a predetermined value is directly generated and set to the transmitter compensation circuitry as the transmitter compensation characteristics.

5. The optical transmission characteristics compensating method according to claim 4, wherein when the non-linear suppression compensation characteristics is directly generated and set to the transmitter compensation circuitry as the transmitter compensation characteristics, non-linear suppression inverse characteristics that are inverse characteristics of non-linear suppression characteristics with which a peak-to-average-power ratio of an output signal from the transmitter compensation circuitry becomes smaller than a predetermined value is generated, a transfer function of the optical transmitter is estimated by using a transfer function of the optical receiver on which the non-linear suppression inverse characteristics are superimposed, and the estimated transfer function of the optical transmitter is set to the transmitter compensation circuitry as the non-linear suppression compensation characteristics.

6. The optical transmission characteristics compensating method according to claim 1, wherein all or some compensation characteristics of the optical transmission path is superimposed on the transmitter compensation characteristics.

7. The optical transmission characteristics compensating method according to claim 1, wherein characteristics that lift an amplitude component at a frequency corresponding to ½ of a baud rate is added to receiver compensation characteristics of the receiver compensation circuitry.

8. An optical transmission characteristics compensating method compensating transmission characteristics of an optical transmitter and an optical receiver connected with each other through an optical transmission path, comprising:
performing part of compensation of the transmission characteristics of the optical transmitter by transmitter compensation circuitry disposed at a stage prior to the optical transmitter;
performing remaining part of compensation of the transmission characteristics of the optical transmitter by an optical filter disposed at a stage subsequent to the optical transmitter; and
performing compensation of the transmission characteristics of the optical receiver by receiver compensation circuitry disposed at a stage subsequent to the optical receiver,
wherein transmitter compensation characteristics of the transmitter compensation circuitry are set so that a peak-to-average-power ratio of an output signal from the transmitter compensation circuitry becomes equal to or smaller than a predetermined value.

9. The optical transmission characteristics compensating method according to claim 8, wherein an optical filter function of a wavelength selection switch is used as the optical filter.

10. An optical transmission characteristics compensating system compensating transmission characteristics of an optical transmitter and an optical receiver connected with each other through an optical transmission path, comprising:
transmitter compensation circuitry disposed at a stage prior to the optical transmitter and performing part of compensation of the transmission characteristics of the optical transmitter;
receiver compensation circuitry disposed at a stage subsequent to the optical receiver and performing remaining part of compensation of the transmission characteristics of the optical transmitter and compensation of the transmission characteristics of the optical receiver;
receiver compensation characteristics setting circuitry adjusting receiver compensation characteristics of the receiver compensation circuitry so that transmission characteristics of an output signal from the receiver compensation circuitry become predetermined characteristics; and
transmitter compensation characteristics setting circuitry setting transmitter compensation characteristics of the transmitter compensation circuitry so that a peak-to-average-power ratio of an output signal from the transmitter compensation circuitry becomes equal to or smaller than a predetermined value.

11. The optical transmission characteristics compensating system according to claim 10, wherein when an optical signal to noise ratio with which predetermined signal quality is obtained for an output signal from the receiver compensation circuitry is larger than a predetermined value, the transmitter compensation characteristics setting circuitry adjusts the transmitter compensation characteristics to decrease a peak-to-average-power ratio of an output signal from the transmitter compensation circuitry, and
when the optical signal to noise ratio with which the predetermined signal quality is obtained is smaller than the predetermined value, the transmitter compensation characteristics setting circuitry adjusts the transmitter compensation characteristics to increase the peak-to-average-power ratio of the output signal from the transmitter compensation circuitry.

12. The optical transmission characteristics compensating system according to claim 10, wherein the transmitter compensation characteristics setting circuitry superimposes any one or a combination of Gaussian characteristics, super Gaussian characteristics, and averaged characteristics of transmission characteristics of the optical transmitter on the transmitter compensation characteristics as non-linear suppression characteristics.

13. The optical transmission characteristics compensating system according to claim 10, wherein the transmitter compensation characteristics setting circuitry includes non-linear suppression characteristics generation circuitry generating non-linear suppression characteristics with which a peak-to-average-power ratio of an output signal from the transmitter compensation circuitry becomes equal to or smaller than a predetermined value, and transmitter compensation characteristics generation circuitry superimposing the non-linear suppression characteristics on compensation characteristics of the transmitter compensation circuitry, and the receiver compensation characteristics setting circuitry superimposes inverse characteristics of the non-linear suppression characteristics on compensation characteristics of the receiver compensation circuitry, or the transmitter compensation characteristics setting circuitry directly generates non-linear suppression compensation characteristics with which a peak-to-average-power ratio of an output signal from the transmitter compensation circuitry becomes smaller than a predetermined value, and sets the non-linear suppression compensation characteristics to the transmitter compensation circuitry as the transmitter compensation characteristics.

14. The optical transmission characteristics compensating system according to claim 13, wherein when the transmitter compensation characteristics setting circuitry directly generates the non-linear suppression compensation characteristics and sets the non-linear suppression compensation characteristics to the transmitter compensation circuitry as the transmitter compensation characteristics, the receiver compensation characteristics setting circuitry generates non-linear suppression inverse characteristics that are inverse characteristics of non-linear suppression characteristics with which a peak-to-average-power ratio of an output signal from the transmitter compensation circuitry becomes smaller than a predetermined value and estimates a transfer function of the optical transmitter by using a transfer function of the optical receiver on which the non-linear suppression inverse characteristics are superimposed, and the transmitter compensation characteristics setting circuitry sets the estimated transfer function of the optical transmitter to the transmitter compensation circuitry as the non-linear suppression compensation characteristics.

15. The optical transmission characteristics compensating system according to claim 10, wherein the transmitter compensation characteristics setting circuitry superimposes all or some compensation characteristics of the optical transmission path on the transmitter compensation characteristics.

16. The optical transmission characteristics compensating system according to claim 10, wherein the receiver compensation characteristics setting circuitry adds characteristics that lift an amplitude component at a frequency corresponding to ½ of a baud rate to receiver compensation characteristics of the receiver compensation circuitry.

17. An optical transmission characteristics compensating system compensating transmission characteristics of an optical transmitter and an optical receiver connected with each other through an optical transmission path, comprising:
    transmitter compensation circuitry disposed at a stage prior to the optical transmitter and performing part of compensation of the transmission characteristics of the optical transmitter;
    an optical filter disposed at a stage subsequent to the optical transmitter and performing remaining part of compensation of the transmission characteristics of the optical transmitter;
    receiver compensation circuitry disposed at a stage subsequent to the optical receiver and performing compensation of the transmission characteristics of the optical receiver;
    receiver compensation characteristics setting circuitry adjusting receiver compensation characteristics of the receiver compensation circuitry so that transmission characteristics of an output signal from the receiver compensation circuitry become predetermined characteristics; and
    transmitter compensation characteristics setting circuitry setting transmitter compensation characteristics of the transmitter compensation circuitry so that a peak-to-average-power ratio of an output signal from the transmitter compensation circuitry becomes equal to or smaller than a predetermined value.

18. The optical transmission characteristics compensating system according to claim 17, wherein the optical filter is an optical filter function of a wavelength selection switch.

* * * * *